United States Patent
Adachi et al.

(10) Patent No.: US 9,059,448 B2
(45) Date of Patent: Jun. 16, 2015

(54) PROCESS FOR PRODUCING POLYMERIC ELECTROLYTE MEMBRANE

(75) Inventors: Shinya Adachi, Shiga (JP); Mayumi Hara, Shiga (JP); Tomonori Kawakami, Shiga (JP); Masayuki Kidai, Shiga (JP)

(73) Assignee: TORAY INDUSTRIES, INC., Shiga (JP)

( * ) Notice: Subject to any disclaimer, the term of this patent is extended or adjusted under 35 U.S.C. 154(b) by 698 days.

(21) Appl. No.: 13/144,987

(22) PCT Filed: Jan. 15, 2010

(86) PCT No.: PCT/JP2010/050403
§ 371 (c)(1),
(2), (4) Date: Sep. 14, 2011

(87) PCT Pub. No.: WO2010/082623
PCT Pub. Date: Jul. 22, 2010

(65) Prior Publication Data
US 2012/0003564 A1 Jan. 5, 2012

(30) Foreign Application Priority Data

Jan. 19, 2009 (JP) .................................. 2009-008552
Jan. 21, 2009 (JP) .................................. 2009-010638
Jul. 17, 2009 (JP) .................................. 2009-168542

(51) Int. Cl.
*H01M 8/10* (2006.01)
*C08J 5/22* (2006.01)

(52) U.S. Cl.
CPC ............ *H01M 8/1081* (2013.01); *C08J 5/2256* (2013.01); *H01M 8/1023* (2013.01); *H01M 8/1067* (2013.01); *H01M 8/1079* (2013.01); *Y02E 60/522* (2013.01); *C08J 2371/10* (2013.01)

(58) Field of Classification Search
CPC ....................................................... H01M 8/10
USPC ................... 429/313, 306, 482, 492; 525/534
See application file for complete search history.

(56) References Cited

U.S. PATENT DOCUMENTS 5,294,675 A * 3/1994 Forster et al. .................. 525/292
5,488,084 A * 1/1996 Kadoi et al. .................. 524/423
(Continued)

FOREIGN PATENT DOCUMENTS

JP 2005-158724 A 6/2005
JP 2006-253124 A 9/2006
(Continued)

OTHER PUBLICATIONS

Journal of Membrane Science 234 (2004) 75-81.*
(Continued)

*Primary Examiner* — Patrick Ryan
*Assistant Examiner* — Alex Usyatinsky
(74) *Attorney, Agent, or Firm* — Pillsbury Winthrop Shaw Pittman, LLP

(57) ABSTRACT

Disclosed is a method for producing a polymer electrolyte membrane, which comprises the steps of: removing a part of a salt component produced during polycondensation from a polymerization solution of a polymer electrolyte having a density of an ionic group of 2 mmol/g or more directly by centrifugal separation, thereby preparing a coating solution; applying the coating solution on a substrate by casting; removing a part of a solvent from the coating solution to form a film-shaped material on the substrate; and bringing the film-shaped material on the substrate into contact with water and/or an aqueous acidic solution to remove the salt component produced during the polycondensation. According to the method for producing an electrolyte membrane, even an electrolyte having a high density of an ionic group can be purified. Also disclosed is an electrolyte membrane capable of being used in a fuel cell which is operated at a high temperature higher than 80° C. and under low humidity conditions having a relative humidity of 60% or less.

10 Claims, 4 Drawing Sheets

(56) References Cited

U.S. PATENT DOCUMENTS

| | | |
|---|---|---|
| 2004/0234841 A1 | 11/2004 | Yoshitake et al. |
| 2006/0167164 A1* | 7/2006 | Sugioka et al. ............... 524/492 |
| 2006/0180796 A1 | 8/2006 | Adachi et al. |
| 2008/0160417 A1* | 7/2008 | Yoshimura ................... 429/310 |
| 2008/0233452 A1 | 9/2008 | Hayamizu et al. |

FOREIGN PATENT DOCUMENTS

| | | |
|---|---|---|
| JP | 2007-204578 A | 8/2007 |
| JP | 2008-7759 A1 | 1/2008 |
| WO | 2008018487 A1 | 2/2008 |

OTHER PUBLICATIONS

Journal of Membrane Science 245 (2004) 61-69.*

Journal Membrane Sc. 2002,197, 231.*

International Search Report in related application PCT/JP2001/050403 mailed Apr. 27, 2010.

* cited by examiner

PROCESS FOR PRODUCING POLYMERIC ELECTROLYTE MEMBRANE

CROSS REFERENCE TO RELATED APPLICATIONS

This application is a U.S. National phase of International Application No. PCT/JP2010/050403, filed Jan. 15, 2010, which in turn claims priority to Japanese Patent Application No. 2009-008552, filed on Jan. 19, 2009 and Japanese Patent Application No. 2009-010638, filed on Jan. 21, 2009 and Japanese Patent Application No. 2009-168542, filed on Jul. 17, 2009. The contents of each of which are incorporated herein by reference in their entirety.

TECHNICAL FIELD

The present invention relates to a method for producing a polymer electrolyte membrane.

BACKGROUND ART

A fuel cell is a kind of electric power supply capable of generating electric energy by electrochemically oxidizing a fuel such as hydrogen or methanol, and an intense interest has been shown towards the fuel cell, as a clean energy supply source, recently. Particularly, it is expected that a polymer electrolyte fuel cell is widely used as a distributed power generation facility of comparatively small scale, and a power generator of mobile bodies such as automobile and marine vessel, because of such low standard operation temperature as about 100° C. and high energy density. Also, an intense interest has been shown towards the polymer electrolyte fuel cell as a power supply of portable mobile equipment and a portable device, and it is expected to install the polymer electrolyte fuel cell in a cellular phone and a personal computer in place of a secondary cell such as nickel-hydrogen cell or lithium ion cell.

In the fuel cell, anode and cathode in which the reaction capable of generating electricity occurs, and a polymer electrolyte membrane being used as a proton conductor between the anode and the cathode usually constitute a membrane electrode assembly (hereinafter sometimes abbreviated to MEA) and a cell comprising separators and MEA sandwiched between the separators is formed as a unit. The polymer electrolyte membrane is mainly composed of the polymer electrolyte material. The polymer electrolyte material is also used for a binder of an electrocatalyst layer or the like.

As a polymer electrolyte material, aromatic polyetherether ketone, aromatic polyetherketone and aromatic polyethersulfone have been actively investigated in point of heat resistance and chemical stability.

Also, in the sulfonated compound (for example, patent documents 1 and 2) of an aromatic polyetherketone (hereinafter, sometimes abbreviated to PES) (examples thereof include VICTREX PEEK-HT, manufactured by VICTREX PLC), there was a problem that because its crystallinity is high, a polymer having the composition of low density of a sulfonic acid group becomes insoluble in a solvent, resulting in poor processability because of a remained crystal moiety. To the contrary, when the density of the sulfonic acid group is increased so as to enhance processability, the polymer is not crystalline and drastically swells in water, and therefore, purification of the polymer becomes very difficult and production of the polymer was not easy.

As a method of controlling an amount of the sulfonic acid group, an example, in which a monomer having a sulfonic acid group introduced is polymerized to form sulfonated aromatic polyethersulfone in which an amount of a sulfonic acid group is controlled, is reported in an aromatic polyethersulfone type (for example, patent document 3). However, also in this method, a problem that a membrane prepared at elevated temperature and at high humidity swells is not solved, and this tendency is remarkable particularly in a fuel solution such as methanol or in composition in which a sulfonic acid group density is high, and in such a polymer electrolyte membrane which is inferior in resistance to hot water and resistance to hot methanol, it was difficult to adequately inhibit fuel crossover such as methanol or the like and to impart mechanical strength for enduring cycling of swelling and drying.

As described above, the polymer electrolyte material according to prior art is insufficient as measures for improving economic efficiency, processability, proton conductivity, fuel crossover, mechanical strength and therefore long-term durability, and there has never been obtained an industrially useful polymer electrolyte material for a fuel cell.

As an invention to solve these problems, in patent document 4, there is proposed a method in which a polymer having a crystallization power is converted to a solution by introduction of a protective group (hydrolytic group for imparting solubility), a film is formed from the solution, and then deprotection (hydrolysis) is carried out, and it is said that by evaluating mechanical characteristics and improving a relation between a chemical structure and resistance to hot water, resistance to hot methanol and processability, an electrolyte membrane, which is excellent in proton conductivity, fuel barrier properties, mechanical strength, resistance to hot water, resistance to hot methanol, processability and chemical stability, can be provided. However, further improvement has been desired.

Further, in patent document 5, there is proposed an electrolyte membrane which is excellent in conductivity and durability by reinforcing with a porous film. However, in patent document 5, since an assembled membrane in which a fluorine-type electrolyte membrane is packed in a fluorine-type fine porous membrane is disclosed, and an exchange capacity of the electrolyte membrane used in an example is 1.25 meq/g, proton conductivity as an assembled polymer electrolyte membrane was insufficient, and moreover since a constituent polymer is a fluorine-type, a hydrogen gas easily permeates through the membrane and therefore durability in an open circuit state in operating a fuel cell using the electrolyte membrane was insufficient.

PATENT DOCUMENT

Patent Document 1: Japanese Unexamined Patent Publication (Kokai) No. 6-93114
Patent Document 2: Published Japanese Translation No. 2004-528683 of the PCT Application
Patent Document 3: U.S. Patent Application No. 2002/0091225
Patent Document 4: Japanese Unexamined Patent Publication (Kokai) No. 2006-261103
Patent Document 5: Japanese Unexamined Patent Publication (Kokai) No. 2007-257884

DISCLOSURE OF THE INVENTION

Problems to be Solved by the Invention

Further improvement in performance of a durability test (dry-wet cycle test), in which a cycle of wetting of an electrolyte membrane accompanied by generating of electricity and drying in an open circuit condition is carried out, has been desired. Moreover, it is necessary to achieve a high level of proton conductivity and a high level of durability simultaneously in order to use in fuel cell applications which are operated at a high temperature higher than 80° C. and under low humidity conditions having a relative humidity of 60% or less such as an automobile application. Particularly, in recent years, since requirements for performance of a fuel cell increase with the advance of fuel cell technology, and higher ionic conductivity is desired in an electrolyte membrane, a situation where an electrolyte polymer having a density of an ionic group of 2 mmol/g or more is desirable occurs.

Here, an electrolyte polymer having a density of an ionic group of 2 mmol/g or more is often synthesized by desalting and polycondensation, and when the polymer is isolated and purified, a polymerization solution is charged into a large amount of water to perform purification by precipitation in order to remove salt of by-product, and after drying the precipitate, the precipitate is redissolved to form a coating solution for membrane formation from a solution. However, the present inventors found out the problem that in this purification, since an electrolyte polymer having a density of an ionic group of 2.0 mmol/g or more is dissolved in water, or purification and isolation of the polymer by a conventional purification by precipitation is very difficult because of extremely large swelling.

Means for Solving the Problems

Thus, the present inventors first made earnest investigations concerning a method in which an electrolyte polymer having a density of an ionic group of 2 mmol/g or more can be industrially purified, and consequently they have noted an unprecedented method of removing a part of a salt component produced during polycondensation from a polymerization solution of the electrolyte polymer directly by centrifugal separation, thereby preparing a coating solution.

The present invention employs the following means in order to solve such problems. That is, a method for producing a polymer electrolyte membrane of the present invention comprises the steps of removing a part of a salt component produced during polycondensation from a polymerization solution of a polymer electrolyte having a density of an ionic group of 2 mmol/g or more directly by centrifugal separation, thereby preparing a coating solution; applying the coating solution on a substrate by casting; removing a part of a solvent from the coating solution to form a film-shaped material on the substrate; and bringing the film-shaped material on the substrate into contact with water and/or an aqueous acidic solution to remove the salt component produced during the polycondensation.

Effects of the Invention

In accordance with the present invention, it becomes possible to industrially purify an electrolyte polymer having a density of an ionic group of 2 mmol/g or more, and therefore an electrolyte membrane having a density of an ionic group of 2 mmol/g or more can be obtained. Further, an assembled polymer electrolyte membrane using the electrolyte polymer can realize a fuel cell having excellent electric generation performance at a high temperature and under low humidity conditions.

BEST MODE FOR CARRYING OUT THE INVENTION

Figure 1:
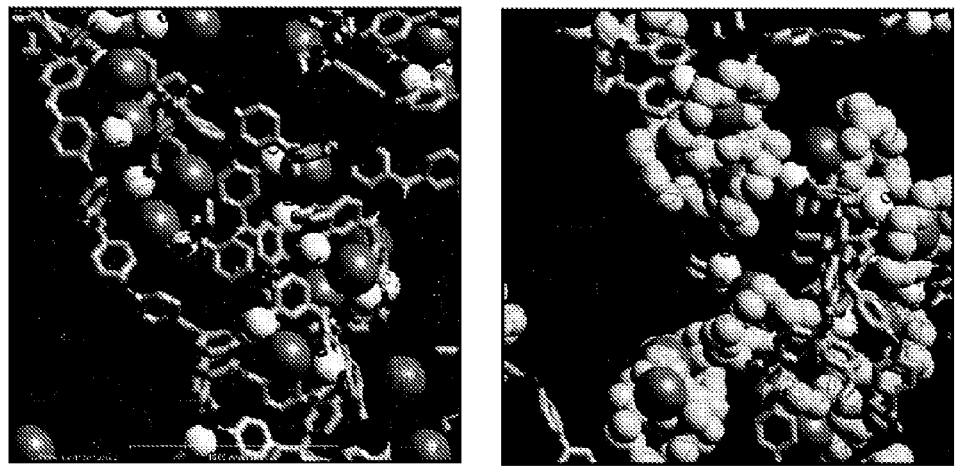
FIG. 1 is a view showing structures of electrolyte polymers to which a crown ether is not added, and added.

Hereinafter, preferable embodiments of the present invention will be described.

The method for producing a polymer electrolyte membrane of the present invention comprises the step of removing a part of a salt component produced during polycondensation from a polymerization solution of a polymer electrolyte having a density of an ionic group of 2 mmol/g or more directly by centrifugal separation, thereby preparing a coating solution.

In the polycondensation of the present invention, a method commonly used in polymer synthesis can be used, and is not particularly limited. For example, a method in which an alkali metal is substituted for a diol end of a monomer containing diol, the resulting compound is reacted with a monomer having dihalide end to desalt and polymerize, or a reaction, in which an acid produced in polymerizing a monomer containing diamine with a monomer containing dicarboxylic chloride is neutralized with an alkali metal to produce a salt component indirectly, can be employed. These methods are suitable particularly for a polymerization system in which salt produced as a by-product is hardly dissolved in a polymerization solvent and precipitated as solid. Further, these methods can also be preferably employed for removal of salt produced as a by-product in a coupling reaction between dihalide and Zn salt other than the polycondensation. Moreover, they are also effective for a system in which an additive or a remaining monomer, insoluble in a polymerization solvent, is present.

Herein, the term "direct" means that a method, in which a polymer is brought into contact with a large amount of a solvent in which by-product salt is soluble and a polymer is insoluble, such as water, methanol, acetone, toluene or hexane to precipitate the polymer in water or the solvent, is not adopted, and a polymerization solution is subjected to centrifugal separation as-is to separate a produced insoluble by-product salt and the like into a solid fraction and a liquid fraction. In this time, the polymerization solution may be diluted with a solvent, in which the polymer electrolyte is soluble, and it is preferred to adjust the viscosity of the polymerization solution in consideration of the efficiency of centrifugal separation operation.

Next, a polymer electrolyte having a density of an ionic group of 2 mmol/g or more will be described. The ionic group is not particularly limited as long as it is an atomic group having negative charge, but the ionic group is preferably a group having a proton exchange capability. As the functional group, a sulfonic acid group, a sulfoneimide group, a sulfuric acid group, a phosphonic acid group, a phosphoric acid group, and a carboxylic acid group are preferably used. Such an ionic group includes the case where the functional groups are in the form of a salt. Examples of the cation, which forms the salt, include any metal cation, and $NR^{4+}$ (R is any organic group). In the case of a metal cation, its valence is not specifically limited and any metal cation can be used. Preferable specific examples of the metal ion include ions of Li, Na, K, Rb, Cs, Mg, Ca, Sr, Ba, Ti, V, Mn, Al, Fe, Co, Ni, Cu, Zn, Zr, Mo, W, Pt, Rh, Ru, Ir, and Pd. Among these, Li, Na, K, Ca, Sr, and Ba are more preferable, particularly, Na and K, which are inexpensive, do not adversely affect the solubility, and are easily capable of proton substitution, are more preferably used. Further, ester may be substituted for the ionic group in addition to metal salts.

Two or more kinds of these ionic groups can be contained in the polymer electrolyte material, and there may be cases where a combination of these ionic groups is more preferable. This combination is appropriately determined depending on a structure of a polymer. Among these ionic groups, it is more preferable to have at least a sulfonic acid group, a sulfoneimide group, and a sulfuric acid group in view of high proton conductivity, and it is most preferable to have at least a sulfonic acid group in view of resistance to hydrolysis.

In recent years, simplification of a water control system is thought to be important for the full-scale popularization of a fuel cell for automobiles or a fuel cell for household use, and power generation is carried out at a high temperature higher than 80° C. and under low humidity conditions having a relative humidity of 60% or less. Accordingly, the electrolyte membrane needs to have a density of an ionic group of 2 mmol/g or more.

Herein, the density of an ionic group refers to the number of mols of an ionic group introduced in 1 g of a dried polymer electrolyte material, and as the value of the density increases, an amount of the ionic group is large. For example, when the ionic group is a sulfonic acid group, the density (mmol/g) of an ionic group can be represented by a value of the density of the sulfonic acid group. Particularly in the present invention, an electrolyte membrane having a density of an ionic group of 2.0 mmol/g or more can be industrially produced. The density of the ionic group can be measured by capillary electrophoresis, elemental analysis or acid-base titration. Among these methods, it is preferable that the density is calculated from a S/C ratio using a capillary electrophoresis method or an elemental analysis method because of ease of the measurement. However, it is also possible to determine the ion-exchange capacity by an acid-base titration method. The density of an ionic group of the present invention uses a value measured by the capillary electrophoresis method, but there is little difference between this value and values measured by other methods, and the values of other methods can be employed. Details of the capillary electrophoresis method will be described in EXAMPLES. The polymer electrolyte membrane of the present invention, as described later, includes an aspect of an assembled polymer electrolyte membrane comprising an electrolyte having a density of an ionic group of 2 mmol/g or more and a porous film, and in this case, the density of the ionic group is determined based on the total amount of the assembled polymer electrolyte membrane.

Further, an example in which the density is calculated from a S/C ratio using an elemental analysis method will be shown below.

A sample of an electrolyte membrane as a specimen was immersed in pure water of 25° C. for 24 hours, and dried in a vacuum at 40° C. for 24 hours, and then elemental analysis was carried out. Analysis of carbon, hydrogen and nitrogen was carried out by a full automatic elemental analysis apparatus varioEL, analysis of sulfur was carried out by a flask combustion method and titration with barium acetate, and analysis of fluorine was carried out by flask combustion and ion chromatogram methods. Density (mmol/g) of sulfonic acid group per unit gram was calculated from a composition ratio of a polymer.

Further, the procedure of the acid-base titration is shown for reference. The measurement is carried out three or more times and the obtained values are averaged.
(1) A sample is ground by a mill and screened through a net sieve #50 and the particles passed through the net sieve are used as a measuring sample.
(2) A sample tube (with a cap) is weighed with a precision balance.
(3) About 0.1 g of the sample obtained in (1) is put in the sample tube and dried in a vacuum at 40° C. for 16 hours.
(4) The sample tube containing the sample is weighed to determine a dry weight of the sample.
(5) Sodium chloride is dissolved in a 30 wt % aqueous solution of methanol to prepare a saturated saline.
(6) 25 mL of the saturated saline obtained in (5) is added to the sample, followed by ion exchange while stirring for 24 hours.
(7) Hydrochloric acid produced is titrated using a 0.02 mol/L aqueous solution of sodium hydrate. As an indicator, two drops of a commercially available phenolphthalein solution for titration (0.1% by volume) are added and it is judged as the end point when the solution shows a reddish purple color.
(8) The density of the sulfonic acid group is determined by the following equation.

Density of sulfonic acid group (mmol/g)=[Concentration (mmol/ml) of aqueous sodium hydroxide solution×amount (ml) added dropwise]/Dry weight (g) of sample Other components, for example, inactive polymers, or organic or inorganic compounds which do not have electric conductivity or ionic conductivity, may be contained in the electrolyte having an ionic group of the present invention within a scope which does not impair the object of the present invention.

Examples of a method for introducing the ionic group include a method of using a monomer having an ionic group and polymerizing it, and a method of introducing an ionic group by a polymer reaction. The present invention uses a polymerization solution of a polymer electrolyte having a density of an ionic group of 2 mmol/g or more, and it is preferred to use a monomer having an ionic group as a raw material in order to stably attain a polymer having a density of an ionic group of 2 mmol/g or more. The ionic group, as described above, includes a metal salt, and the metal salt of an ionic group is preferable because it can reduce detachment and decomposition of the ionic group in a polymerization step, and in the step of removing a part of a solvent to form a film-shaped material on the substrate, the film-shaped material is thermally stable during drying the solvent, and corrosion of the film-shaped material due to acid can be reduced, and therefore cost of production facilities can be reduced.

When a monomer having the metal salt of an ionic group is used, it is preferred to include a step of desalting and polycondensing by adding a cyclic metal scavenger and/orglycols. The monomer having the metal salt of an ionic group is preferably introduced in a polymer chain in order to obtain the polymer electrolyte having a density of an ionic group of 2 mmol/g or more, but the monomer having the metal salt of an ionic group is often solid and hardly dissolved in an organic solvent. If a polycondensation reaction is carried out with the metal salt in a solid state, the density of a sulfonic acid group of the resulting polymer tends to be lower than a stoichiometric value.

The present inventors found that by adding a cyclic metal scavenger and/or glycols to perform polycondensation, (1) solubility of a monomer, which contains a metal salt of an ionic group, in a polymerization solvent can be increased, and a molecular weight of a polymer electrolyte, having a density of an ionic group of 2 mmol/g or more, can be increased, and (2) it becomes possible to suppress the thermal decomposition of an ionic group due to heating during polymerization and partial gelation due to aggregation of a metal salt end of an ionic group.

The cyclic metal scavenger of the present invention is not particularly limited as long as it forms chelate complex with a metal cation or has a structure which subsumes a metal cation. As the cyclic metal scavenger, for example, porphyrin, phthalocyanine, corrole, chlorin, cyclodextrin, crown ethers, thiacrown ethers formed by substituting S or NH for o of the crown ether, and azacrown ethers are preferably used. Crown ethers are suitable from the viewpoint of polymerization stability or ease of removal, and among these, 12-crown-4 (1,4,7,10-tetraoxacyclododecane), 15-crown-5 (1,4,7,10,13-pentaoxacyclopentadecane), and 18-crown-6 (1,4,7,10,13,16-Hexaoxacyclooctadecane) are suitably used, and 18-crown-6 is optimal because of low cost. These may be used singly, or may be used as a mixture of two or more thereof. Further, amounts of these additives are appropriately determined experimentally and are not particularly limited, but these amounts are preferably the molar number or less of a metal salt of an ionic group in a monomer used.

As the glycols, polyhydric alcohols such as ethylene glycol, diethylene glycol, triethylene glycol and glycerin; and polyglycols typified by polyalkyl glycol such as polyethylene glycol and polypropylene glycol are preferably used. Among these, polyalkyl glycol is preferable, and polyethylene glycol is more preferable. A molecular weight of polyglycols is preferably 4000 or less which does not interfere with properties of an electrolyte polymer, and more preferably 600 or less, at which polyglycols are liquid at room temperature from the viewpoint of affinity for a solvent.

If the above-mentioned cyclic metal scavenger and/or glycols are added during polycondensation, this achieves the above effects, and it is preferable from the following effects to comprise the step of adding the cyclic metal scavenger and/or glycols prior to the step applying the coating solution onto a substrate by casting.

The reason for this is that in the production process of the polymer electrolyte membrane containing a metal salt of an ionic group, if the cyclic metal scavenger and/or glycols is added, this inhibits aggregation between metal salts of an ionic group to make free metal salt soluble in a solvent, and therefore this addition achieves an effect in the step of applying a coating solution onto a substrate by casting, and it becomes possible to provide a polymer electrolyte membrane with high quality and high durability in which electric generation performance under low humidity conditions is improved. That is, since not only the addition during polycondensation but also the addition at the subsequent step have the above effect, it is preferred to add the cyclic metal scavenger and/or glycols at other step as long as it is performed before the step of applying a coating solution onto a substrate by casting.

Further, the cyclic metal scavenger and/or glycols is preferably removed before the final stage of the electrolyte membrane from the viewpoint of improving mechanical strength and water resistance, and it is preferred to comprise the step of removing the cyclic metal scavenger and/or glycols after the step of removing a part of the solvent to form a film-shaped material on the substrate. A method of removing them is not particularly limited, but this removing operation is preferably carried out at the step of contact with water and/or an aqueous acidic solution from the viewpoint of improving productivity.

With respect to the effect of adding the cyclic metal scavenger and/or glycols, the present inventors made an assumption that the added cyclic metal scavenger exerts an interaction on a metal cation coupled with the ionic group, and an added molecule cuts in between ionic group/metal cation/ionic group to develop the effect of addition. That is, it is assumed that the cyclic metal scavenger and glycols are coordinated to the metal cation coupled with the ionic group, and act as protective agents of the ionic group to cause thermal decomposition during polymerization or during solvent-drying after application by casting to hardly occur, and its steric hindrance inhibits aggregation between ionic groups, the solubility of a monomer having a metal salt of the ionic group in a polymerization solvent is improved, and production of aggregate at a production step of an electrolyte membrane can be reduced.

As the reason of the assumption, calculation results by computational science are shown below.

The present inventors investigated a microstructure of a polymer electrolyte membrane containing potassium sulfonate having added crown ether which is one of a cyclic metal scavenger by molecule simulation. Molecule simulation is a technique which is successing in obtaining reliable findings concerning atomic-level detail structure and movement of liquid, polymer and protein models, which cannot be investigated by experiments, by outstanding improvement in a computational speed of computer and development of methodology in recent years.

The present inventors calculated, first, molecular orbitals at a B3LYP/6-31G (d,p) level and evaluated interactional energy between $K^+$ and crown ether (18-crown-6). A method of molecular orbitals is a method which resolves Schrodinger equation numerically to evaluate an electron state of molecules. As a result of calculation, interactional energy between $K^+$ and crown ether was 77 kcal/mol and it was found that a bond therebetween is very strong compared with a hydrogen bond (about 5 kcal/mol). This result shows that crown ether can be suitably used as a $K^+$ scavenger.

Next, the present inventors investigated a microstructure of an electrolyte polymer to which crown ether was added using a molecular dynamics method. The molecular dynamics method is a technique which sequentially resolves equations of motion of a molecular group system for all constituent molecules to determine an orbital of each molecule.

In this calculation, calculation of molecular dynamics was executed using a polymer model shown in a structural formula (1). An asterisk in the structural formula indicates to be continued.

(Chem 1)

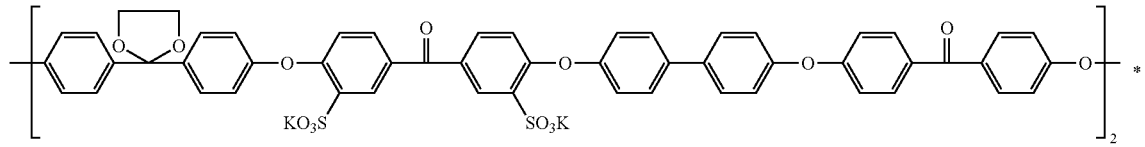

-continued

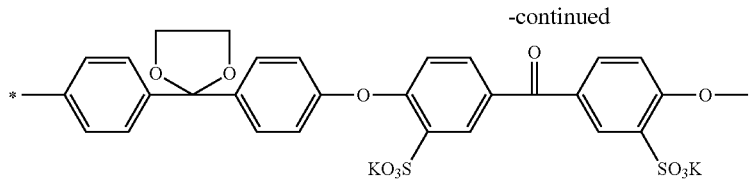

As composition of a system, 4 molecules of a polymer shown in the structural formula (1) were arranged, and 410 molecules of a NMP molecule were arranged so that a concentration of a polymer solution is 20 weight % (crown ether not added model). Moreover, an additional model, in which 24 molecules of crown ethers (18-crown-6) were arranged so as to be equal in mole to a sulfonic acid group in a polymer, was made (crown ether added model).

With respect to calculation conditions, temperature was controlled so as to be 25° C. by use of a Nose-Hoover method [M. Tuckerman, B. J. Berne and G. J. Martyna, J. Chem. Phys. 97, 1990 (1992)]], and pressure was controlled so as to be 1 atm by use of a Parrinello-Rahman method [M. Parrinello and A. Rahman, J. Appl. Phys., 52, 7182 (1981)] using an oblique cell. Further, calculations of vdW interaction and electrostatic interaction in a real space were performed assumed that a cut off radius rc=10 angstroms, and calculation of electrostatic interaction in a reciprocal space was performed assumed that a cut off radius $\alpha=0.21$ angstroms$^{-1}$ and $|n|^2_{max}=50$ by use of a Ewald method.

With respect to potential parameters used in molecular dynamics calculation, equilibrium positions of a bonding length and bonding angle of a polymer, dihedral angle forcefield parameter, charge, and vdW parameter of K$^+$ were optimized by use of molecular orbital calculation. Further, as a vdW parameter of SO$^{3-}$ portion, parameters described in a literature [W. R. Cannon, B. M. Pettitt, J. A. McCammon, J. Phys. Chem., 98, 6225 (1994)] were employed. As other parameters, general-purpose parameter AMBER [W. D. Cornell, P. Cieplak, C. I. Bayly, I. R. Gould, K. M. Merz Jr, D. M. Ferguson, D. C. Spellmeyer, T. Fox, J. W. Caldwell and P. A. Kollman, J. Am. Chem. Soc., 117, 5179 (1995)] and DREIDING [S. L. Mayo, B. D. Olafson, W. A. Goddard III, J. Phys. Chem., 94, 8897 (1990)] were employed.

Structures of a crown ether not added model and a crown ether added model, which are determined by use of molecular dynamics calculations, are shown in FIG. 1. A left side indicates the crown ether not added model and a right side indicates the crown ether added model. A white sphere represents S (sulfonic acid group), a dark gray sphere represents K$^+$, and a gray rod represents an electrolyte polymer, a light gray sphere represents crown ether, and a gray rod represents NMP. From FIG. 1, it was found that in an article not having added crown ether, the sulfonic acid groups are intensely aggregated with K$^+$ interposed therebetween, and in an article having added crown ether, crown ether cut in between sulfonic acid group/K$^+$/sulfonic acid group.

In order to estimate the effect of inhibiting aggregation between sulfonic acid groups quantitatively, a radial distribution function and coordination number between sulfur atoms in a sulfonic acid group were calculated. Herein, the radial distribution function g(r) is an average number of particles $<n_{ij}(r)>$ multiplied by a normalized constant, as shown in equation (1). Herein, the average number of particles $<n_{ij}(r)>$ represents an average of the number of particles existing in a region which centers on a certain particle i and has a radius r±Δr. Further, the coordination number is a value obtained by integrating the average number of particles $<n(r)>$ up to a certain distance.

[Nume 1]

$$g(r) = \frac{1}{4\pi r^2 \Delta r} \frac{\langle V \rangle}{N_j} \langle n_{ij}(r) \rangle \qquad (1)$$

Figure 2:
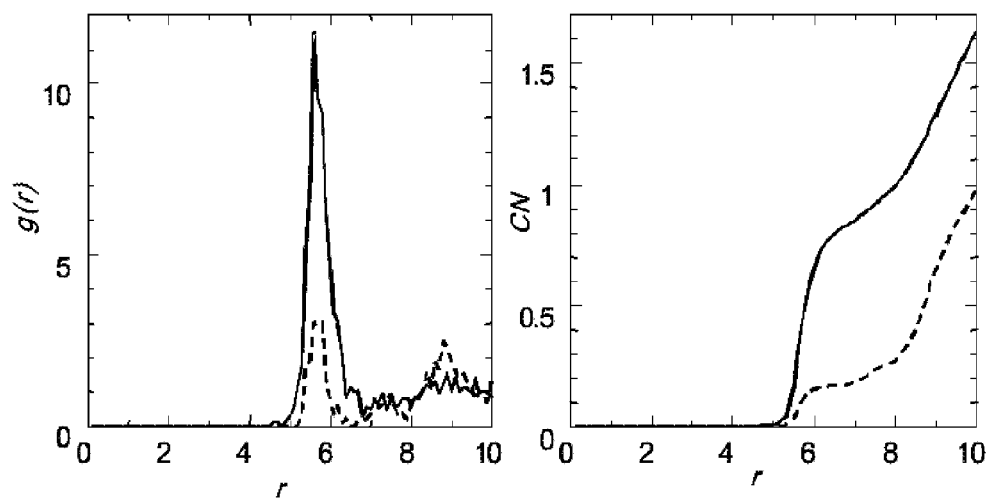
FIG. 2 is a view showing a radial distribution function and a coordination number between sulfur atoms in a sulfonic acid group.

Calculation results are shown in FIG. 2. A figure on a left side is a graph in which a vertical axis is the radial distribution function g(r) and a horizontal axis is r (angstrom), and a figure on a right side is a graph in which a vertical axis is the coordination number CN and a horizontal axis is r (angstrom). Solid line indicates a crown ether not added model, and broken line indicates a crown ether added model. From FIG. 2, it was found that the coordination number of an article not having added crown ether is about 0.8 at a position of the first peak of the radial distribution function. This indicates that another sulfonic acid group exists at a high probability of about 80% in a first coordination zone of the sulfonic acid group. On the other hand, it was found that the coordination number between sulfonic acid groups of an article having added crown ether is about 0.2 and has much less coordination number than the article not having added crown ether.

The results of the above molecule simulation suggests an assumption that by adding the cyclic metal scavenger or glycols exerting a strong interaction on a metal cation coupled with the ionic group, an added molecule cuts in between ionic group/metal cation/ionic group to inhibit aggregation. Further, from the viewpoint of inhibiting aggregation of the ionic group, it is preferred to add an aggregation inhibitor so that a coordination number between sulfonic acid groups is 0.4 or less in a first coordination zone.

When the aggregation of the ionic group is thus inhibited, since a polymer in which a hydrophilic portion and a hydrophobic portion are even is obtained, and the membrane becomes less in strain and large in elongation, a membrane which has high durability in applications of the electrolyte membrane where a cycle of swelling/shrinkage is repeated.

Further, when a free metal salt is contained in a polymer electrolyte solution in addition to the metal salt of an ionic group, a metal cation composing the metal salt is coupled with the cyclic metal scavenger and/or glycols and the metal salt can be soluble in a solvent. In addition, when a monomer and an oligomer containing the metal salt of an ionic group are insoluble in a solvent, the monomer and the oligomer can be soluble in a solvent by adding the cyclic metal scavenger and/or glycols.

Next, the centrifugal separation of the present invention is a method of applying a centrifugal force to a sample by use of a centrifuge, and separating liquid (polymer electrolyte solution) and solid (by-product salt, basic compounds, remaining monomers) by virtue of difference in specific gravity, and publicly known methods can be applied. Heretofore, centrifugal separation has been applied to recovery of polymers purified by precipitation or recovery of regenerated ion-exchange resin, for example, but in the present invention, the centrifugal separation is adopted to precipitate unnecessary solid such as salt as a by-product and recover a polymerization solution. It is preferred to adjust the viscosity of the polymerization solution from the viewpoint of increasing efficiency of salt removal. When centrifugal separation is performed, the concentration of the polymerization solution is preferably 10 Pa·s or less, more preferably 5 Pa·s or less, and furthermore preferably 1 Pa·s or less. When the viscosity is 10 Pa·s or less, a centrifugal effect is high, and centrifugal separation can be performed in a short time using an industrial centrifuge. The centrifugal force can be appropriately determined experimentally according to a difference in specific gravity between a by-product salt and a polymer solution, viscosity of the polymerization solution, a solid content, and apparatuses to be used. A centrifugal force is 5000 G or more, preferably 10000 G or more, and more preferably 20000 G or more, and an apparatus which can be continuously operated at times other than removal of a precipitate is industrially suitable.

It is also effective that for the purpose of enhancing the efficiency of a centrifugal separation step, a polymerization solution is left standing prior to the centrifugal separation step to precipitate coarse by-product salt and use a supernatant, and it is also preferred to perform a two stage centrifugal separation in which a part of coarse by-product salt is precipitated by a centrifugal force of 5000 G or less.

The present invention may comprise the step of filtration by a filter in combination with the centrifugal separation step. The filtration by a filter is an operation of passing a mixture (polymerization solution) of liquid (polymer electrolyte solution) and solid (by-product salt, basic compounds, remaining monomers, etc.) through a porous body (filtering material) which has many fine holes (pores) to separate solid particles having a larger diameter than that of the hole from liquid. Publicly known methods can be applied to the filtration by a filter, and conditions of filtering can be appropriately determined depending on a size of salt desired to be removed from the polymerization solution or viscosity of the polymerization solution, and publicly known methods, such as natural filtration, centrifugal filtration, filtering under a reduced pressure, and pressure-filtering, can be employed, and a filtering object liquid may be heated. A filter is not particularly limited, and it can be appropriately selected from a metal mesh, a cellulose-type filter, a glass fiber filter, a membrane filter, a filter fabric and a filter plate according to an amount of the polymerization solution to be treated or a filtration system. Further, when the centrifugal separation is combined with the filtration by a filter, a solid fraction (by-product salt, basic compounds, remaining monomers, etc.) in the polymerization solution can be removed more efficiently than the filtration by a filter alone.

Further, it is also useful to condense the polymerization solution by distillation under a reduced pressure or ultrafiltration in order to adjust the viscosity and the solid content to a level suitable for application prior to an application step. Particularly when viscosity adjustment of the polymerization solution is carried out in order to increase the efficiency of centrifugal separation and filtration by a filter, it is preferred to condense the polymerization solution. Further, coatability may be improved by condensation of the polymerization solution. Publicly known methods can be usually applied to the condensation, and a condensing apparatus, which includes a mixing machine and can prevent the generation of a coating due to evaporation of a solvent, can be more preferably used. It is preferable from the viewpoint of productivity and environmental protection to reuse the solvent recovered by condensation.

Next, the step of applying a coating solution obtained by separating the polymerization raw solution into solid and liquid directly through centrifugal separation onto a substrate by casting, and removing a part of the solvent to form a film-shaped material on the substrate will be described.

The solvent used in the present invention can be appropriately selected experimentally according to polymerization conditions or composition of an electrolyte polymer, and as the solvent, an aprotic polar solvent such as N,N-dimethylacetamide, N,N-dimethylformamide, N-methyl-2-pyrrolidone, dimethyl sulfoxide, sulfolane, 1,3-dimethyl-2-imidazolidinone, or hexamethylphosphonetriamide; an ester-type solvent such as γ-butyrolactone or butyl acetate; a carbonate-type solvent such as ethylene carbonate or propylene carbonate; or an alkylene glycol monoalkyl ether such as ethylene glycol monomethyl ether, ethylene glycol monoethyl ether, propylene glycol monomethyl ether, and propylene glycol monoethyl ether is suitably used, and these may be used alone, or may be used as a mixture of two or more thereof. Further, in order to adjust the viscosity of the electrolyte solution, an alcohol-type solvent such as methanol or isopropanol; a ketone-type solvent such as acetone or methyl ethyl ketone; an ester-type solvent such as ethyl acetate, butyl acetate, or ethyl lactate; a hydrocarbon-type solvent such as hexane, or cyclohexane; an aromatic hydrocarbon-type solvent such as benzene, toluene, or xylene; a halogenated hydrocarbon-type solvent such as chloroform, dichloromethane, 1,2-dichloroethane, dichloromethane, perchloroethylene, chlorobenzene, or dichlorobenzene; an ether-type solvent such as diethyl ether, tetrahydrofuran, or 1,4-dioxane; a nitrile-type solvent such as acetonitrile; a nitrated hydrocarbon-type solvent such as nitromethane or nitroethane; or a low boiling point solvent such as water can be used as a mixture thereof.

Examples of usable polymer electrolyte in the present invention include aromatic hydrocarbon-type polymers having an ionic group such as ionic group-containing polyphenylene oxide, ionic group-containing polyetherketone, ionic group-containing polyetherether ketone, ionic group-containing polyethersulfone, ionic group-containing polyetherether sulfone, ionic group-containing polyether phosphine oxide, ionic group-containing polyetherether phosphine oxide, ionic group-containing poly(phenylene sulfide), ionic group-containing polyamide, ionic group-containing polyimide, ionic group-containing polyetherimide, ionic group-containing polyimidazole, ionic group-containing polyoxazole and ionic group-containing polyphenylene. Herein, the ionic group is as described above.

A method of synthesizing these polymers is not particularly limited as long as the method can satisfy the above-mentioned characteristics and requirements. Such a method is described in, for example, Journal of Membrane Science, 197, 2002, p. 231-242. The present invention is a method which is limited to desalting/polycondensation among polymerization methods, and is the most effective if it is applied in the presence of basic compounds.

Preferable polymerization conditions on a polymerization method are as follows. The polymerization can be carried out at a temperature within a range from 0 to 350° C., but the temperature is preferably 50 to 250° C. When the temperature is lower than 0° C., the reaction may not tend to proceed adequately, and when the temperature is higher than 350° C., decomposition of the polymer may tend to be initiated. The reaction is preferably carried out in a solvent. Examples of usable solvent include aprotic polar solvents such as N,N-dimethylacetamide, N,N-dimethylformamide, N-methyl-2-pyrrolidone, dimethyl sulfoxide, sulfolane, 1,3-dimethyl-2-imidazolidinone, and hexamethylphosphonetriamide, but the usable solvent is not limited to these solvents and may be any solvent which can be used as a stable solvent in the aromatic nucleophilic substitution reaction. These organic solvents can be used alone or in combination.

Examples of the basic compound include sodium hydroxide, potassium hydroxide, sodium carbonate, potassium carbonate, sodium hydrogen carbonate, and potassium hydrogen carbonate, but the basic compound can be used without being limited to these compounds as long as it can convert aromatic diols into an active phenoxide structure.

As an inorganic salt to be eliminated, that is, a reaction end of a monomer, a combination of a monovalent alkali metal and halogen is preferably used. Specifically, the combination of Li, Na, K or Rb and F, Cl, Br or I is used. In consideration of cost and a cyclic metal scavenger, the combination of Na or K and F or Cl is particularly preferably used. The eliminated inorganic salt may be coupled with a basic compound or a decomposed product of the basic compound. The decomposed product of the basic compound may interfere with a polymerization reaction, and a cyclic metal compound has the effect of inhibiting this interference.

In the polycondensation, water is sometimes produced as by-product. In this case, water can also be removed out of the system in the form of an azeotrope by making toluene or the like coexist irrespective of a polymerization solvent in the reaction system. As the method of removing water out of the system, an absorbent such as molecular sieve can be used.

An azeotropic agent used for removing reaction water or water introduced during the reaction is generally any inert compound which does not substantially interfere with polymerization, is azeotropically distilled with water and boiled at a temperature of about 25 to about 250° C. Common azeotropic agent is such as benzene, toluene, xylene, chlorobenzene, methylene chloride, dichlorobenzene, and trichlorobenzene. Naturally, it is useful to select such azeotropic agent that its boiling point is lower than that of a dipolar solvent used. Generally, the azeotropic agent is used, but it is not always necessary when a high reaction temperature, for example, a temperature of 200° C. or higher, is employed, particularly when a reaction mixture is continuously sprayed with an inert gas, and when an inside of a reaction system is maintained at a reduced pressure to lower a boiling point of a solvent. Generally, the reaction is desirably performed in a state of oxygen-free in an inert atmosphere.

When a condensation reaction is carried out in a solvent, the monomer is preferably charged so as to adjust the concentration of the resulting polymer within a range from 5 to 50% by weight. When the concentration is less than 5% by weight, the polymerization degree tends to hardly increase. On the other hand, when the concentration is more than 50% by weight, viscosity of the reaction system increases too much and a post-treatment of a reaction product tends to be difficult.

When solubility of the resulting polymer is in sufficient, an appropriate hydrolytic group for imparting solubility may be introduced, as required, and after polymerization, the hydrolytic group for imparting solubility may be removed by hydrolysis.

The hydrolytic group for imparting solubility of the present invention is a substituent temporarily introduced in order to facilitate membrane formation from a solution or filtration on the assumption that the substituent is introduced in a polymer hardly soluble in a solvent and is removed through hydrolysis in the following steps in the case where the hydrolytic group for imparting solubility is not introduced. The hydrolytic group for imparting solubility can be appropriately selected experimentally in consideration of reactivity, yield, stability of a state in which the hydrolytic group for imparting solubility is contained, and production cost. The stage, at which the hydrolytic group for imparting solubility is introduced in the polymerization reaction, may be a monomer, an oligomer or a polymer, and can be appropriately selected.

Specific examples of the hydrolytic group for imparting solubility include a method in which a site to ultimately become ketone is modified to an acetal site or a ketal site as a hydrolytic group for imparting solubility, and this site is modified to a ketone site by hydrolysis after membrane formation from solution. There is a method in which the ketone site is modified to a heteroatom analog of an acetal site or a ketal site, for example, thioacetal or thioketal. There are also methods in which sulfonic acid is modified to a soluble ester derivative, and in which a t-butyl group is introduced into an aromatic ring and de-t-butylated with an acid.

Since the hydrolytic group for imparting solubility improves the solubility in a common solvent and reduces crystallinity, aliphatic groups are used as a hydrolytic group for imparting solubility in that steric hindrance is large, and particularly aliphatic groups including a cyclic moiety are preferably used.

The position of the functional group, at which the hydrolytic group for imparting solubility is introduced, is more preferably a main chain of the polymer. When the hydrolytic group for imparting solubility is introduced in the main chain, a difference between the state at the time of introduction of the hydrolytic group for imparting solubility and the state after changing the hydrolytic group for imparting solubility to a stable group by hydrolysis is large, and packing of the polymer chain tends to be stronger, and the solubility of the polymer changes from soluble in a solvent to insoluble in a solvent, resulting in an increase in mechanical strength. As used herein, the functional group, which is present in the main chain of the polymer, is defined as a functional group in which a polymer chain is cleaved when the functional group is eliminated. For example, this means that if a ketone group of aromatic polyetherketone is eliminated, benzene rings are isolated from one another.

This introduction of the hydrolytic group for imparting solubility is particularly effective for an application to a polymer having a property capable of crystallizing (crystallization power). The presence or absence of the crystallinity of these polymers, and states of a crystal phase and an amorphous phase can be evaluated by a peak derived from a crystal in a wide X-ray diffraction (XRD), or by a crystallization peak in a differential scanning calorimetry (DSC). When the electrolyte membrane has a crystallization power, an electrolyte membrane in which changes in dimension (swelling) in hot water or hot methanol are small, that is, an electrolyte membrane which is excellent in resistance to hot water and resistance to hot methanol can be attained. When the changes in dimension are small, the membrane is hardly damaged during being used as an electrolyte membrane, and since peeling of the membrane from an electrocatalyst layer by swelling hardly occurs, electric generation performance is good.

The polymer electrolyte having a density of an ionic group of 2 mmol/g or more of the present invention preferably has a property capable of crystallizing (crystallization power) from the viewpoint of suppressing swelling due to water or a methanol aqueous solution or maintaining mechanical strength in wetting, and copolymerization of a monomer having a hydrolytic group for imparting solubility is particularly preferable in producing the above polymer electrolyte.

In the case of a polymer electrolyte, in which a hydrolytic group for imparting solubility is introduced for the purpose of improving solubility, it is particularly effective to comprise the step of the present invention of removing a part of a salt component produced during polycondensation from a polymerization solution directly by centrifugal separation, thereby preparing a coating solution. For example, if a purification step of performing precipitation in water without carrying out the above-mentioned purification based on the direct centrifugal separation of the polymerization solution is employed, there was a problem that a part of the hydrolytic group for imparting solubility is hydrolyzed to cause the occurrence of a gel-like substance. Further, there may be cases where in the step of redissolving a polymer in a solvent to form a coating solution after isolating the polymer, the hydrolytic group for imparting solubility becomes insufficient and a part of the hydrolytic group for imparting solubility is not completely dissolved to deteriorate a rate of filtration by a filter significantly, an extraneous material resulting from a gel-like substance having slipped through the filter is produced at the time of membrane formation, and vertical streaks are produced, and an incidence of a defective piece increases. Further, even though the membrane looks a good item, the electrolyte membrane has an uneven structure like a sea-isle structure due to a gel-like substance having slipped through the filter, and this often causes tensile elongation or tearing strength to deteriorate, or often causes a membrane to be cloudy and damages quality. Even in the drying step, since the gel-like substance contains an extremely large amount of water, a drying time is lengthened to reduce productivity.

Since the hydrolytic group for imparting solubility is aimed at improving the solubility in a polymerization solvent, it is preferred to eliminate the hydrolytic group for imparting solubility by hydrolysis after the steps of forming a coating solution and applying the coating solution onto a substrate by casting. A part of the hydrolytic group for imparting solubility can also be removed by heating at the time of drying a solvent, but in the present invention, since the step of bringing the film-shaped material on the substrate into contact with water and/or an aqueous acidic solution to remove a salt component produced during polycondensation is essential, it is preferred from the viewpoint of productivity to hydrolyze the hydrolytic group for imparting solubility simultaneously in this step to remove it.

As a polymer electrolyte having a density of an ionic group of 2 mmol/g or more, which is used in the method for producing an electrolyte membrane of the present invention, an aromatic hydrocarbon electrolyte containing the hydrolytic group for imparting solubility is preferably used for the above reason in considering ultimate performance of an electrolyte membrane, and an aromatic polyetherketone-type electrolyte is particularly preferable. Since the aromatic polyetherketone-type has good packing of an aromatic ring and high structural regularity, it can form an electrolyte membrane having excellent water resistance even when the resulting density of an ionic group is 2 mmol/g or more. From the viewpoint of structural regularity, a residual ratio of a hydrolytic group for imparting solubility in the resulting electrolyte membrane is preferably 20% by mole or less with respect to a repeating unit of a polymer unit, and more preferably 10% by mole or less.

In the present invention, it is determined whether the structural regularity of the resulting electrolyte membrane is high or low by a full width (Hz) at half maximum of a peak of 133 ppm which is a main peak of aromatic. When this value is smaller (peak is sharp), it is determined that the electrolyte membrane has higher structural regularity, and the full width at half maximum is preferably 800 Hz or less, and more preferably 700 Hz or less. If the full width at half maximum is 800 Hz or less, it can be determined that stacking of aromatic is good and durability can be improved. Particularly, the method for producing an electrolyte membrane of the present invention is suitable for the production of an electrolyte membrane in which a half width (Hz) of 133 ppm is 800 Hz or less and the density of an ionic group is high. The structural regularity of the electrolyte membrane prepared by the method for producing an electrolyte membrane of the present invention can be evaluated by solid $^{13}$C DD/MAS NMR. Details of this will be described in EXAMPLES.

As a substrate used in the present invention, publicly known material can be used, and examples of the substrate includes an endless belt or a drum made of metal such as stainless steel; a film composed of a polymer such as polyethylene terephthalate, polyimide or polysulfone; glass; and a release paper. In the case of metal, the surface is subjected to mirror finish, and in the case of a polymer film, a coated surface is subjected to a corona discharge treatment or a peeling treatment, and when a continuous application is carried out in the form of a roll, a backside of a coated surface can be subjected to a peeling treatment to prevent the electrolyte membrane from adhering to a backside of a coated substrate after taking-up the membrane. In the case of a film substrate, its thickness is not particularly limited, but it is preferably 30 to 200 μm from the viewpoint of handling.

As a method of applying a coating solution by casting, coating techniques such as knife coating, direct roll coating, gravure coating, spray coating, brush application, dip coating, die coating, vacuum die coating, curtain coating, flow coating, spin coating, reverse coating and screen printing can be employed.

A thickness of the electrolyte membrane prepared in the present invention is not particularly limited, but usually, an electrolyte membrane having a thickness of 3 to 500 μm is suitably used. An electrolyte membrane having a thickness of 3 μm or more is preferable for achieving film strength to stand up to practical use, and an electrolyte membrane having a thickness of 500 μm or less is preferable for reducing film resistance, that is, for improving electric generation performance. More preferable range of the membrane thickness is 5 to 200 μl, and furthermore preferable range is 8 to 200 μm. This membrane thickness can be controlled by various methods according to application methods. For example, when the coating solution is applied by a comma coater or a direct coater, the membrane thickness can be controlled by a solution concentration or a thickness of a solution applied onto a substrate, and when a slit die coater is used, the membrane thickness can be controlled by a discharge pressure, a nozzle clearance or a gap between a nozzle and a substrate.

In the method for producing an electrolyte membrane of the present invention, as a method of removing a part of a solvent to form a film-shaped material on a substrate, a method of heating a coated film applied on a substrate by casting to evaporate a solvent is preferable. As an evaporating method, publicly known methods, such as heating of a substrate, hot air and an infrared heater, can be selected.

A drying time and a drying temperature of the coated film can be appropriately determined experimentally, but it is preferred to dry the coated film at least to such an extent that if the coated film is peeled from a substrate, the film becomes self-supported.

Next, the step of bringing the film-shaped material on the substrate into contact with water and/or an aqueous acidic solution to remove the salt component produced during the polycondensation will be described.

In the present invention, it is essential to remove salt which cannot be removed by centrifugal separation by bringing the film-shaped material into contact with water and/or an aqueous acidic solution. When the salt is present, durability of the electrolyte membrane tends to be deteriorated starting from a salt portion. For example, when the concentration of a salt component contained in a film-shaped material before the membrane is brought into contact with water and/or an aqueous acidic solution is denoted by $C_3$% by weight, and the concentration of a salt component after bringing the film-shaped material on the substrate into contact with water and/or an aqueous acidic solution is denoted by $C_4$% by weight, it is preferred that $C_3<5$, and $C_4/C_3<0.3$. When the $C_3$ is less than 5% by weight, not only removal of salt in the step of bringing the film-shaped material into contact with water and/or an aqueous acidic solution can be performed with efficiency, but also defects such as voids resulting from the trace of escaped salt can be reduced, and if $C_4/C_3<s$ less than 0.3, salt in the electrolyte membrane does not adversely affect electric generation performance. $C_3$ is more preferably 3% by weight or less, and furthermore preferably 1% by weight or less.

Values of $C_3$ and $C_4$ can be determined by a method of heat treating a film-shaped material, a weight of which has been weighed in advance, at 300° C. for 10 minutes as a pretreatment of measurement of a salt component to make it insoluble, immersing the film-shaped material in weight-known water overnight, and measuring a salt concentration extracted in the water by ion chromatography, or capillary electrophoresis. The reason why the film-shaped material is heat treated at 300° C. for 10 minutes is that the film-shaped material can be dissolved in water depending on composition of the polymer electrolyte or a density of an ionic group, and a crosslinking agent may be previously added in order to confirm the effect of the step of centrifugal separation. In the present invention, a metal cation extracted with water from the film-shaped materials before and after bringing the film-shaped material into contact with water and/or an aqueous acidic solution is defined as a metal cation derived from remaining salt.

By the step of bringing the film-shaped material into contact with water and/or an aqueous acidic solution, water-soluble impurities in the membrane, remaining monomer, and solvents can be removed, and extraction/cleaning of the above-mentioned cyclic metal scavenger and/or glycols described above and further hydrolysis of the hydrolytic group for imparting solubility, if containing the same, can be achieved at the same step. Moreover, when the aqueous acidic solution is selected, if the ionic group is a metal salt, production efficiency can be improved since proton exchange can also be achieved. Water and an aqueous acidic solution may be heated for acceleration of a reaction. The aqueous acidic solution is not particularly limited, and sulfuric acid, hydrochloric acid, nitric acid, or acetic acid can be used, and temperature, concentration and the like can be appropriately selected experimentally. A 30 weight % or less aqueous sulfuric acid solution of 80° C. or lower is preferably used in view of productivity.

Further, it is preferred that the concentration of a remaining solvent in an film-shaped material before the membrane is brought into contact with water and/or an aqueous acidic solution is 5% by weight or more and 50% by weight or less. That is, by using a phenomenon in which a solvent in the film-shaped material is replaced with water and/or an aqueous acidic solution, it is possible to achieve the permeation of water and/or an aqueous acidic solution into the film-shaped material efficiently, and it becomes easy to remove a salt component.

When the film-shaped material contains a metal salt of an ionic group or a hydrolytic group for imparting solubility, in the methods of hydrolysis of a hydrolytic group and of proton exchange of a metal salt of an ionic group, the efficient contact of the film-shaped material with an acidic solution is preferable, and particularly in an industrial continuous treatment, it is preferred that the acidic solution acidic solution is permeated into the membrane efficiently and that a hydrolyzed by-product or proton exchanged salt can be eluted out of the membrane efficiently. The present inventors employs, as the most industrially feasible method, a method of controlling the concentration of a remaining solvent in an film-shaped material before the membrane is brought into contact with water and/or an aqueous acidic solution so as to be 5% by weight or more and 50% by weight or less, by use of being membrane formation from a solution, and thereby the efficiency of the hydrolysis of a hydrolytic group and proton exchange of a metal salt of an ionic group can be enhanced.

Particularly when the electrolyte membrane is continuously prepared, it is preferred to bring the film-shaped material into contact with water and/or an aqueous acidic solution without peeling the film-shaped material from the substrate. By bringing the film-shaped material into contact with water and/or an aqueous acidic solution without peeling from the substrate, it is possible to prevent the membrane from breaking due to swelling or from producing wrinkles or surface defects during drying the membrane. This method is effective particularly when a thickness of the electrolyte membrane is small. When a thickness of the electrolyte membrane is small, mechanical strength is deteriorated at the time of swelling due to liquid and breakage of the membrane at the time of production tends to occur, and moreover, wrinkles are easily produced to cause surface defects at the time of drying after the contact with water and/or an aqueous acidic solution. For example, when an electrolyte membrane, a thickness of which is 50 μm or less at the time of drying, is produced, it is preferred to bring the membrane into contact with water and/or an aqueous acidic solution without peeling off the film-shaped material from a substrate, and it is more preferred when the above-mentioned thickness is 30 μm or less.

When the film-shaped material is brought into contact with water and/or an aqueous acidic solution without peeling off from the substrate, since the permeation of the water and/or the aqueous acidic solution or the elution of a salt component can be achieved only through a surface, on the side of which the substrate does not exist, it is more preferable to control the concentration of a remaining solvent in an electrolyte membrane precursor before the membrane is brought into contact with water and/or an aqueous acidic solution so as to be 5% by weight or more and 50% by weight or less.

In the usual membrane formation from a solution of a polymer membrane, a polymer is dissolved in a solvent, the resulting solution is applied onto a substrate by casting, and applied solution is heated to dry, and thereby the solvent is evaporated to be removed. In this time, generally, performance and quality of a film is improved by removing the solvent as far as possible, but in the method of producing an electrolyte membrane of the present invention, the concentration of a remaining solvent in an electrolyte membrane precursor is kept at 5% by weight or more and 50% by weight or less by controlling the evaporation of a solvent. When the concentration is 5% by weight or more, the permeation of the water and/or the aqueous acidic solution becomes better, and when it is 50% by weight or less, the strength of the electrolyte membrane is sufficient. The concentration is preferably 8% by weight or more, and furthermore preferably 10% by weight or more. Further, the concentration is preferably 40% by weight or less, and furthermore preferably 30% by weight or less.

Factors to control the concentration of a remaining solvent in the film-shaped material largely depends on apparatus to be used, and in the case of continuous membrane formation, it can be realized to control the concentration of a remaining solvent by appropriately determining conditions, such as a temperature and an air rate of a drying furnace, a coating rate and the like, experimentally.

The concentration of a remaining solvent can be determined by the calculation of the following equation 1 when a weight of the film-shaped material is denoted by W1, and a weight measured after the same film-shaped material is washed with warm water of 60° C. for 8 hours and dried at 100° C. for 8 hours in a vacuum is denoted by W2.

Concentration of remaining solvent in film-shaped material(weight %)=$(W1-W2)/W1\times100$ (Eq. 1)

Further, in the present invention, components other than a solvent such as absorbed water content, components extracted with water and volatile additives are treated as a remaining solvent as a matter of convenience.

Further, to the coating solution after centrifugal separation of the present invention fillers or inorganic fine particles may be added, or a storage stabilizer, a network forming agent composed of polymers and metal oxides, or a crosslinking agent may be added for the purpose of improving mechanical strength of the electrolyte membrane, thermal stability of the ionic group, water resistance, solvent resistance, radical resistance, coatability of the coating solution, and storage stability. Further, additives used for usual polymer compounds, such as nucleating agents, plasticizers, stabilizers, mold-releasing agents and antioxidants can be added within a scope which does not impair the object of the present invention.

Further, preferable aspects of a polymer electrolyte membrane prepared by the production method of the present invention includes an aspect in which a fine porous membrane, a nonwoven fabric, a mesh, or paper is impregnated at the step of applying a coating solution by casting to form an assembled polymer electrolyte membrane. If the membranes are assembled, generally, proton conductivity is remarkably decreased, but in the present invention, since a polymer electrolyte membrane having a density of an ionic group of 2 mmol/g or more can be easily prepared, reduction in proton conductivity can be suppressed and changes in dimension by containing a water content can be reduced by impregnating a fine porous membrane, a nonwoven fabric or a mesh at the step of applying a coating solution by casting, and therefore if a fuel cell is formed using the polymer electrolyte membrane, the fuel cell can achieve excellent electric generation performance under low humidity conditions and high durability simultaneously.

When the polymer electrolyte membrane prepared by the production method of the present invention is used for such an assembled polymer electrolyte membrane, if the produced polymer electrolyte has a density of an ionic group of 2 mmol/g or more, electric generation performance under low humidity conditions becomes better, and the density of an ionic group is more preferably 2.5 mmol/g or more.

The density of an ionic group of the assembled polymer electrolyte membrane is preferably 1.5 mmol/g or more, and in this range, proton conductivity sufficient for normal power generation can be achieved. From the viewpoint of improving power generation characteristics under low humidity conditions, the density of an ionic group of the assembled polymer electrolyte membrane is preferably 2.0 mmol/g or more.

If a change rate of dimension in a direction of plane is 5% or less when the assembled polymer electrolyte membrane is immersed in hot water of 80° C. for 24 hours, durability in repeating operation (power generation)/stop of a fuel cell, in which the assembled polymer electrolyte membrane is used, is improved. The change rate is more preferably 3% or less, and furthermore preferably 10 or less.

A reinforcing material used for producing the above-mentioned assembled polymer electrolyte membrane is not particularly limited, but it preferably contains a porous film having a porosity of 60% or more and a Gurley permeability of 1000 seconds/100 cc or less. By using such a porous film, it becomes possible to make a thickness of the assembled polymer electrolyte membrane smaller than that of porous material composed of other fibers, and the occurrence of pinholes during impregnation and film formation is reduced.

In the prior art, the porosity of a porous body is often referred to, but the present inventors found out that not only the porosity is directly linked with ionic conductivity, but also existence of pores not leading from the front to the back (dead end pore or independent pore) of the porous body is linked with ionic conductivity. Thus, the present inventors have noted Gurley permeability.

A porosity of a porous film used for the assembled polymer electrolyte membrane is appropriately determined experimentally according to a density of an ionic group of the polymer electrolyte to be used, but it is preferably 60% or more, and more preferably 70% or more from the viewpoint of ease of packing of a polymer electrolyte solution. When the porosity is less than 60%, packing of a polymer electrolyte solution does not penetrate into the membrane, and a proton conducting path is decreased. Further, an upper limit of the porosity is not particularly limited as long as there is no problem in the step of forming a membrane. The upper limit of the porosity can be appropriately determined experimentally according to a coating rate and tension of the membrane formation step, or specifications of a carrying system in a membrane forming device, and it is preferred that the upper limit is usually 90% from the viewpoint of preventing stretch, vertical streaks or breakage of a film due to tension.

The porosity of the porous film can be determined by cutting out the porous film into square pieces, measuring a length L (cm) of a side, a weight W (g) and a thickness D (cm) of the piece, and calculating the following equation:

Porosity=$100-100(W/\rho)/(L_2\times D)$, wherein ρ represents a film density before stretching. A ρ value is determined according to D method (Density Gradient Tube Method) of JIS K 7112 (1980). As a solution for the density gradient tube at this time, ethanol and water are used.

A thickness of a porous film used for the assembled polymer electrolyte membrane can be appropriately determined according to a thickness of a desired assembled polymer electrolyte membrane, but the thickness is practically preferably 1 to 100 μm. When the thickness is less than 1 μm, there may be cases where the film is stretched, vertical streak is produced, or the film is broken due to tension in a membrane formation step or a secondary processing step. When the thickness is more than 100 μm, packing of the polymer electrolyte becomes insufficient and proton conductivity is deteriorated.

A Gurley permeability of a porous film used for the assembled polymer electrolyte membrane can be appropriately determined experimentally according to viscosity and a solid content of a polymer electrolyte solution to be packed, and a membrane formation rate, but it is preferably 1000 seconds/100 cc or less, more preferably 500 seconds/100 cc or less, and furthermore preferably 250 seconds/100 cc or less from the viewpoint of a practical membrane formation rate and proton conductivity of the assembled polymer electrolyte membrane.

When the Gurley permeability is more than 1000 seconds/100 cc, since a through hole property of the porous film is extremely low, packing of the polymer electrolyte is insufficient and proton conductivity is deteriorated, and therefore the porous film is difficult to use for the assembled polymer electrolyte membrane. Further, a lower limit of the Gurley permeability is not particularly limited as long as there is no problem in the step of forming a membrane. The lower limit of the Gurley permeability can be appropriately determined experimentally according to a coating rate and tension of the membrane formation step, or specifications of a carrying system in a membrane forming device, and it is preferred that the lower limit is usually 1 sec/100 cc from the viewpoint of preventing stretch, vertical streaks or breakage of a film due to tension.

The Gurley permeability can be measured at 23° C. at 65% relative humidity according to JIS P 8117 (unit: seconds/100 ml). The same measurement is carried out five times on the same sample, and an average value of the resulting Gurley permeabilities is taken as a Gurley permeability of the sample.

A Gurley permeability which is one of a measure of permeability of the porous film used for the assembled polymer electrolyte membrane can be controlled by an additive amount of the additive added to a propylene resin composing the porous film, and conditions in a production process step, for example, crystallization conditions (metal drum temperature, peripheral speed of a metal drum, thickness of the resulting unstretched sheet, etc.) in solidifying a melt polymer in the casting step, stretching conditions (stretching direction (lengthwise or transverse), stretching mode (lengthwise or transverse uniaxial stretching, lengthwise-transverse or transverse-lengthwise successive biaxial stretching, simultaneous biaxial stretching, restretching after biaxial stretching)) in the stretching step, stretching ratio, stretching speed, stretching temperature).

Further, liquid paraffin permeation time which is one of measures exhibiting an impregnating property of the electrolyte solution is preferably 0.1 to 60 sec/25 μm. As used herein, the liquid paraffin permeation time refers to a time from when liquid paraffin is added dropwise to a porous film till when the liquid paraffin permeates in a thickness direction of the film, the pores of the film is filled with the paraffin and the film becomes transparent, and specifically, the liquid paraffin permeation time is determined by measuring a time from when a liquid paraffin droplet impinges on a film surface till when the film becomes completely transparent, and converting this time to a time per a thickness of 25 μm using a mean film thickness around the paraffin addition point. Accordingly, the liquid paraffin permeation time is one of measures exhibiting permeability of a film, and when the liquid paraffin permeation time is smaller, it implies that permeability of a film is more excellent, and when the liquid paraffin permeation time is larger, it implies that permeability of a film is lower. The liquid paraffin permeation time is more preferably 1 to 30 sec/25 μm, and the most preferably 1.5 to 10 sec/25 μm.

A material of the porous film is not particularly limited as long as it is dissolved in the polymer electrolyte solution, does not block proton conduction and satisfies the above characteristics. An aliphatic polymer, an aromatic or a fluorine-containing polymer is preferably used in considering from the viewpoint of heat resistance or the effect of reinforcing mechanical strength. Examples of the aliphatic polymer include polyethylene, polypropylene, polyvinyl alcohol, and ethylene-vinyl alcohol copolymer, but the material is not limited these. As used herein, polyethylene is a generic name of ethylene-type polymers having a crystal structure of polyethylene, and examples of the polyethylene include linear high-density polyethylene (HDPE), low-density polyethylene (LDPE), and in addition, copolymers of ethylene and other monomers, and specific examples thereof include ethylenes referred to as linear low-density polyethylene (LLDPE), copolymers of ethylene and α-olefin, and ultra high molecular weight polyethylene. Further, as used herein, polypropylene is a generic name of propylene-type polymers having a crystal structure of polypropylene, and include propylene-type block copolymers and random copolymers (these are a copolymer of propylene with ethylene or 1-bitene) commonly used.

Examples of the aromatic polymer include polyester, polyethylene terephthalate, polycarbonate, polyimide, polysulfone, polyetherketone, polyetherether ketone, and aromatic polyamide.

As the fluorine-containing polymer, thermoplastic resins, which has at least one carbon-fluorine bond in a molecule, are used, and thermoplastic resins having a structure, in which fluorine atoms are substituted for all of or the major portion of hydrogen atoms of aliphatic polymer, are suitably used. Specific examples of such the polymers include polytrifluoroethylene, polytetrafluoroethylene, polychlorotrifluoroethylene, poly(tetrafluoroethylene-hexafluoropropylene), poly(tetrafluoroethylene-perfluoroalkylether), and polyvinylidene fluoride, but is not limited to these. Among these, polytetrafluoroethylene and poly(tetrafluoroethylene-hexafluoropropylene) are preferable, and polytetrafluoroethylene is particularly preferable.

These porous films may be used alone, or may be bonded to another material to be used. Further, among porous films, an aliphatic polyolefin film typified by polyethylene and polypropylene is preferable from the viewpoint of electrochemical stability and cost, and a biaxially oriented porous polypropylene film is particularly preferable from the viewpoint of permeability to a polymer electrolyte solution having a density of an ionic group of 2 mmol/g or more and resistance to heating in a membrane formation step or during generating electricity.

A technique of forming pores of an aliphatic polyolefin film is broadly divided into a wet method and a dry method. As a method for producing a biaxially oriented porous polypropylene film, methods disclosed in Japanese Unexamined Patent Publication (Kokai) No. 2005-171230 or International Publication WO 2007/046226 can be employed. A large number of pores can be formed in a biaxially stretched oriented film at low cost by a β-phase crystallization method in which a β crystal with low crystal density (crystal density: 0.922 g/cm$^3$) is formed in preparing an unstretched sheet by melt extrusion of polypropylene, and a transition of the β crystal to an α crystal with high crystal density (crystal density: 0.936 g/cm$^3$) occurs by stretching the sheet to form pores by the difference in density between both crystals.

The reason why the biaxially oriented porous polypropylene film prepared by this method is suitable for an assembled polymer electrolyte membrane of the present invention is that a void state is three-dimensional network and therefore permeability of the polymer electrolyte solution is high. Therefore, the concentration of a polymer electrolyte in the polymer electrolyte solution can be raised to 10% by weight or more, and a tough assembled membrane can be easily attained after drying. A higher concentration of the polymer electrolyte is preferable, but the concentration of the polymer electrolyte is adjusted in a range of 10 to 50% by weight from the viewpoint of an impregnating property, and viscosity of the polymer electrolyte is preferably in a range of 0.5 to 10 Pa·s.

When it is desired to use a porous film having a thickness of 10 µm or less, which has high porosity, since a porous film having this thickness is inferior in handling, a porous film having a thickness of 20 µm or more is used, and then the porous film is split into two layers in a thickness immediately before the porous film is impregnated with a polymer electrolyte solution. Thereby, a thin porous film having a thickness of 10 µm or less can be formed, and production of an assembled polymer electrolyte membrane using an ultrathin porous film can be introduced commercially. In this time, the above-mentioned biaxially oriented porous polypropylene film is easily split into two layers in a thickness direction and is preferable from the viewpoint of continuously forming an assembled polymer electrolyte membrane of an ultrathin porous film having a thickness of 10 µm or less and a polymer electrolyte having a density of an ionic group of 2 mmol/g or more.

Further, a porous film described in Patent Publication No. 1299979 (claim 1), which is obtained by a wet-extraction method comprising the steps of adding a substance to be extracted to polyolefin to finely disperse the substance, forming a sheet of polyolefin, extracting the substance to be extracted with a solvent to form pores, and stretching the film before or after extracting, as required, can also be used.

A method for producing an assembled polymer electrolyte membrane of the present invention preferably comprises the steps of removing a part of a salt component produced during polycondensation from the polymerization solution of a polymer electrolyte having a density of an ionic group of 2 mmol/g or more directly by centrifugal separation, thereby preparing a coating solution; and bringing the coating solution into contact with water and/or an aqueous acidic solution to remove the salt component produced during the polycondensation, and in addition to these, the step of applying the coating solution onto a porous film, having a porosity of 600 or more and a Gurley permeability of 1000 seconds/100 cc or less and considered as a substrate, by casting to impregnate the porous film with the coating solution.

A method of impregnating the porous film with the coating solution is not particularly limited, and an aspect, in which the porous film is brought into contact with a coating solution of a polymer electrolyte having a density of an ionic group of 2 mmol/g or more, may be employed, and a step of immersing the porous film in a coating solution tank in which the coating solution was held and pulling out it may also be employed. This impregnation step may be continuously carried out, or may be carried out sheet-by-sheet.

Further, the step of applying the coating solution onto a substrate by casting and then bonding the porous film to the substrate to impregnate the porous film with the coating solution is preferable, and it is particularly preferable to comprise the step of applying the coating solution onto the porous film, considered as a substrate, by casting to impregnate the porous film with the coating solution and then bonding the substrate to the porous film for the purpose of attaining an assembled polymer electrolyte membrane with high quality by reducing wrinkles. By bonding the porous film impregnated with the coating solution to the substrate, and drying the porous film, it is possible to prevent the occurrences of shrinkage of the porous film or uneven casting of the coating solution, and a low-wrinkle assembled polymer electrolyte membrane can be obtained. Further, in the case of continuous membrane formation, it is not necessary to introduce an expensive carrying system and it is possible to carry the membrane by a common roll support system, and the control of carrying tension becomes easy, and stable production of the assembled polymer electrolyte membrane becomes possible. Moreover, it becomes possible to use a porous film having a thickness of 10 µm or less.

In the step of bonding a substrate to the porous film of the present invention, it is preferred to bond a substrate to the porous film with the coating solution applied by casting sandwiched therebetween, and gases within the porous film pushed out by impregnation of the coating solution is escaped toward a side not facing the substrate and prevented from being accumulated in the substrate and the porous film to cause surface defects or unevenness of the assembled polymer electrolyte membrane.

A substrate herein includes, as described above, an endless belt or a drum made of metal such as stainless steel or hastelloy; a film composed of a polymer such as polyethylene terephthalate, polyimide, polysulfone or polypropylene; glass; and a release paper, and these can be appropriately selected according to production equipment or a heating temperature. In the above-mentioned case of subjecting the electrolyte membrane to an acid treatment without peeling the electrolyte membrane from a substrate, a film composed of a polymer is preferable because of ease of continuous processing, and polyethylene terephthalate is preferable from the viewpoint of cost, heat resistance and chemical resistance.

When the method for producing an electrolyte membrane comprises the step of applying the coating solution onto a substrate by casting and then bonding the porous film to the substrate to impregnate the porous film with the coating solution, or the step of applying the coating solution on the porous film by casting to impregnate the porous film with the coating solution and then bonding the substrate to the porous film, the method for producing an electrolyte membrane preferably further comprises the step of applying the coating solution on the porous film by casting after the step of impregnating the porous film having a porosity of 60% or more and a Gurley permeability of 1000 seconds/100 cc or less with the coating solution for the purpose of improving power generation characteristics and durability of a fuel cell using the assembled polymer electrolyte membrane. The constitution of the assembled polymer electrolyte membrane is preferably a constitution of electrolyte single layer/assembled layer of a porous film and an electrolyte/electrolyte single layer because an interface resistance between an electrode and an assembled polymer electrolyte membrane at the time of forming a membrane electrode assembly for a fuel cell can be reduced.

In the method for producing an assembled polymer electrolyte membrane of the present invention, when a substrate is bonded to a porous film with the coating solution applied by casting sandwiched therebetween, the coating solution with which the film is impregnated is penetrated to an opposite side of the porous film by a capillary action, and therefore a coating consisting of only an electrolyte is formed on the porous film. By further comprising the step of applying the coating solution onto the porous film by casting after the step of impregnating the porous film with the coating solution, the porous film can be impregnated with the coating solution from both sides of the porous film, and the above-mentioned a constitution of electrolyte single layer/assembled layer of a porous film and an electrolyte/electrolyte single layer can be easily formed. The step of applying the coating solution onto the porous film by casting may be carried out after removing a part of a solvent in the porous film impregnated with the coating solution, or may be carried out before removing a part of a solvent.

When a die coater is used during the step of applying by casting, it is also a preferable example that coating is performed by use of a two-layered nozzle so that a density of an ionic group differs between a polymer electrolyte predominantly packed within the porous film and a polymer electrolyte present at a surface layer. In this case, it is preferred from the viewpoint of proton conductivity that the density of an ionic group of the polymer electrolyte predominantly packed within the porous film is larger than that of the polymer electrolyte present at a surface layer.

Further, the method for producing an assembled polymer electrolyte membrane of the present invention preferably comprises the step of splitting the porous film into two or more layers in a thickness direction. For example, since it is difficult to stably produce a practical thin membrane of a porous film of 10 μm or less, the production of an assembled polymer electrolyte membrane using the porous film is performed by comprising the step of splitting the porous film into two or more layers in a thickness direction prior to the step of applying the coating solution onto a substrate by casting and then bonding the porous film to the substrate to impregnate the porous film with the coating solution or the step of applying the coating solution onto the porous film by casting to impregnate the porous film with the coating solution and then bonding the substrate to the porous film, and one of the porous films split into two layers is used. The other of the porous films split into two layers is preferably recovered. By employing this method, it becomes possible to prepare an assembled polymer electrolyte membrane using a porous film having a thickness of 10 μm or less. Further, by splitting the porous film, since a portion where surface pores of the porous film are blocked is eliminated, there is an effect that the coating solution becomes more permeable, and therefore it is preferred that both sides of the porous film are split away and a central portion is used.

Further, in the method for producing an assembled polymer electrolyte membrane, it is also preferred from the viewpoint of durability that void portions not packed with an electrolyte are crushed by a pressing step or a hot pressing step. Furthermore, it is preferred that in the step of impregnating the porous film with the coating solution, impregnation of the coating solution is assisted and unpacked portions within the porous film are reduced by depressurizing or pressurizing.

One example of a schematic view of a constitution of a continuous application system by casting for producing an assembled polymer electrolyte membrane is shown in FIGS. 3 to 6. The application system can be appropriately selected according to a coating solution and a porous film to be used for producing an assembled electrolyte.

Figure 3:
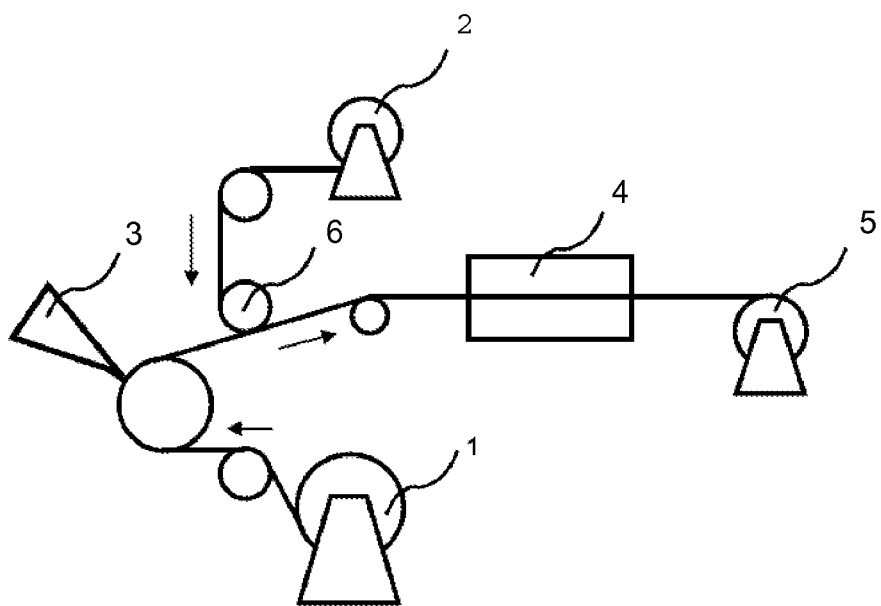
FIG. 3 is a schematic view of a constitution of a continuous application system by casting for producing an assembled polymer electrolyte membrane.

FIG. 3 is a schematic view of a constitution of the case where a coating solution is applied onto a substrate, a porous film is bonded to a coated surface, and a membrane continuously dried. Further, by interchanging settings of the substrate and the porous film, this constitution can be changed to a constitution in which the coating solution is applied onto the porous film and the substrate is bonded to a coated surface. If a drying furnace in this case is carried by a floating system, surface defects of the assembled polymer electrolyte membrane can be prevented.

Figure 4:
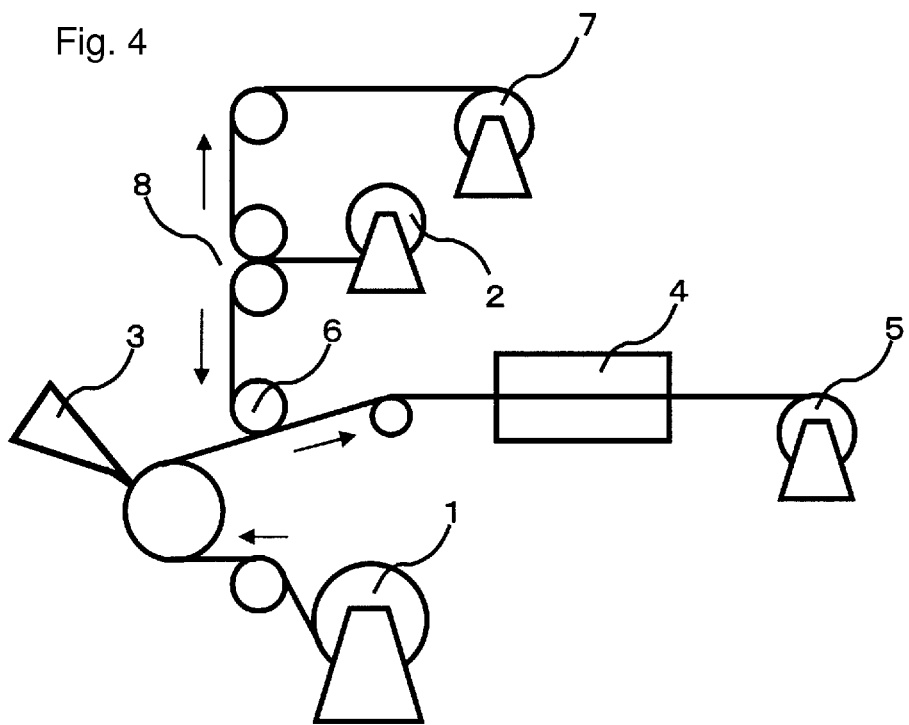
FIG. 4 is a schematic view of a constitution of a continuous application system by casting for producing an assembled polymer electrolyte membrane.

FIG. 4 is a schematic view of a constitution of the case where a coating solution is applied onto a substrate, the porous film is split into two layers in a thickness direction, one of the porous films split into two layers is bonded to a coated surface, and the other split porous film is taken-up and reused. The case where the porous film having a thickness of 10 μm or less is used is a particularly preferable aspect. The constitution view where the porous film is split into two layers is shown, but it is also possible to peel a side opposite to the peeled side prior to bonding one of the porous films.

Figure 5:
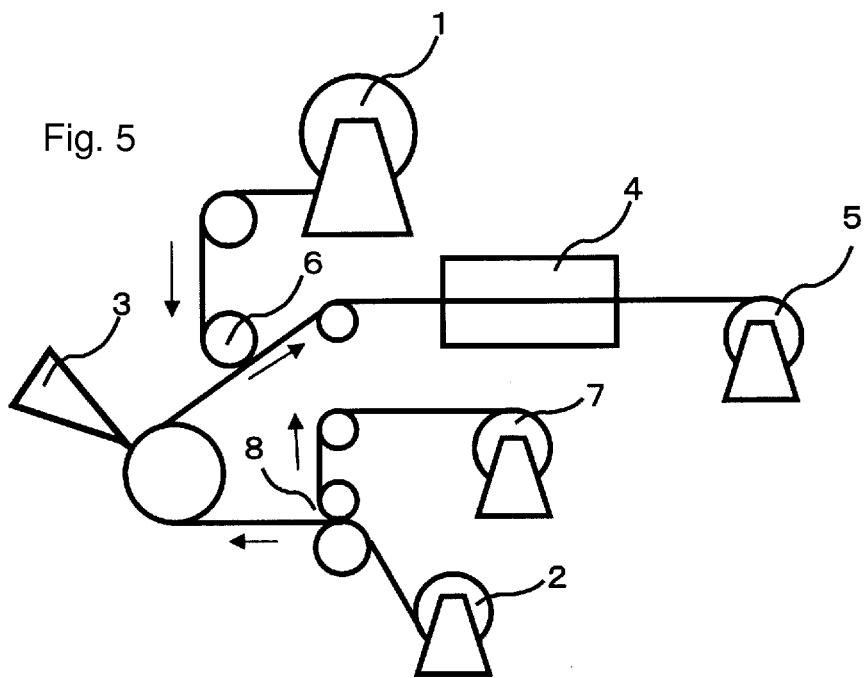
FIG. 5 is a schematic view of a constitution of a continuous application system by casting for producing an assembled polymer electrolyte membrane.

FIG. 5 is a schematic view of a constitution of the case where the porous film is split into two layers in a thickness direction, the coating solution is applied onto one of the porous films split into two layers, and the substrate is bonded to the split porous film. The other split porous film is taken-up and reused as with FIG. 4.

Figure 6:
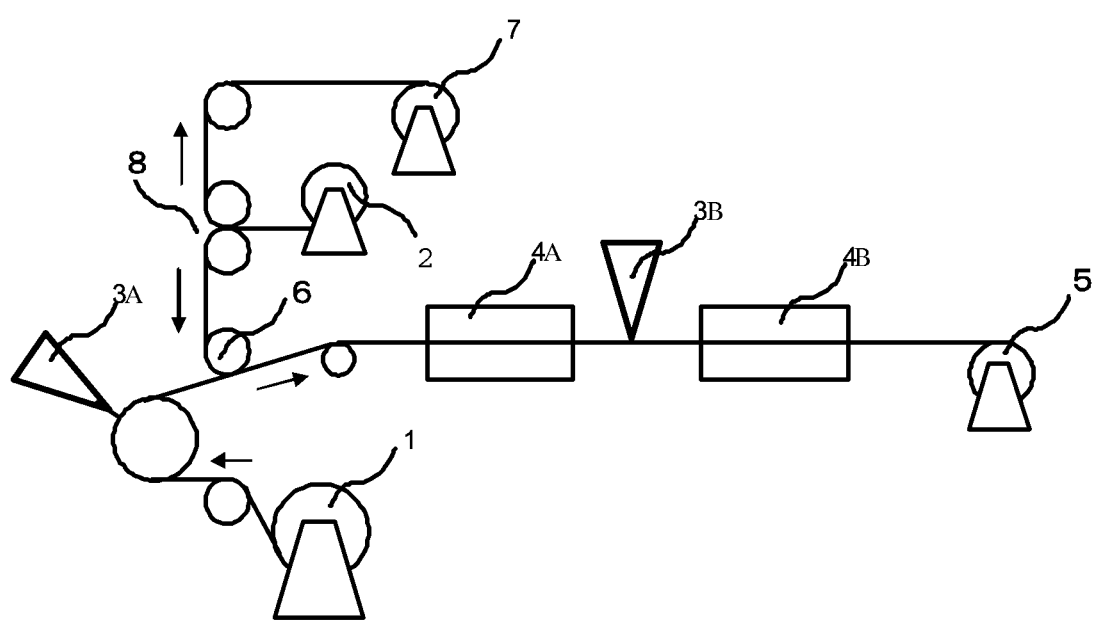
FIG. 6 is a schematic view of a constitution of a continuous application system by casting for producing an assembled polymer electrolyte membrane.

FIG. 6 has the same constitution as in FIG. 4, and is a schematic view of a constitution of the case where after drying in a first drying furnace, a coating solution is further applied onto a porous film and dried in a second drying furnace. Since the film can be impregnated with the coating solution from both sides, an assembled polymer electrolyte membrane with less uneven impregnation can be produced. This constitution is described in only FIG. 6, but can be adopted to FIGS. 3 to 5. A position of a second application portion (3B) may be an upstream of the first drying furnace (4A). When the wettability of the coating solution to the porous film is low, for example, coating solution repellency, the constitution of FIG. 6 is more favorable from the viewpoint of surface quality of the assembled polymer electrolyte membrane since the wettability of the coating solution to the porous film tends to be improved.

In order to enhance the wettability of the coating solution to the porous film, the porous film may include a mechanism for corona discharge treatment, plasma treatment, static electricity removal, chemical treatment, and the like.

EXAMPLES

Hereinafter, the present invention will be described in more detail by way of examples, but the present invention is not limited to these examples. In addition, measurement conditions of properties are as follows.

(1) Density of Ionic Group

The following procedure was carried out five times, and an average value of three points was take as a density (mmol/g) of an ionic group, excluding a maximum value and a minimum value.

(1) The prepared electrolyte membrane was cut out into pieces of 5 cm×5 cm, and dried at 80° C. for 1 hour or more under a reduced pressure in a vacuum drier, and a weight (Wm) was precisely (to four digits to the right of the decimal) measured.

(2) About 30 ml of an about 0.2 weight % aqueous solution of KCl was put in a sample bottle with a cap, a weight (Wk) and a K ion concentration ($C_1$) of the KCl aqueous solution were measured. The K ion concentration was measured with a capillary electrophoresis apparatus "CAPI-3300" manufactured by Otsuka Electronics Co., Ltd. Measurement conditions are as follows.

Measurement method: head method (25 mm)

Migration solution: migration solution 5 (α-CF1105) for cation analysis manufactured by Otsuka Electronics Co., Ltd.

Measurement voltage: 20 kV (3) The above-mentioned electrolyte membrane was immersed in the KCl aqueous solution in which a weight and a K ion concentration were known.

(4) A K ion concentration ($C_2$) of the KCl aqueous solution was measured again with the capillary electrophoresis apparatus. From the measurements, the density of a sulfonic acid group was calculated according to the following equation:

Density of sulfonic acid group(mmol/g)=$[\{Wk \times (C_1-C_2) \times 1000\}/39]/Wm$ (2) Measurement of Salt Component Contained in Film-Shaped Material In the present invention, a salt component concentration was taken as a concentration of a cation present in the film-shaped material as a matter of convenience.

(1) A film-shaped material before bringing the film-shaped material into contact with water and/or an aqueous acidic solution was cut out into a piece of 5 cm×5 cm, and the cut film-shaped material was dried for 5 hours in a vacuum, and then its weight $W_0$ was measured.

(2) Next, the film-shaped material was subjected to a heat treatment at 300° C. for 10 minutes in a nitrogen atmosphere.

(3) Next, about 150 ml of water was put in a sample bottle with a cap, a weight $W_W$ of water was measured, and the above-mentioned film-shaped material was immersed in water, heated to 40° C., and immersed for one hour.

(4) The concentration of the cation in water after the test was measured with a capillary electrophoresis apparatus "CAPI-3300" manufactured by Otsuka Electronics Co., Ltd., and a total value of the concentration was denoted by X %. Measurement conditions are as follows.

Measurement method: head method (25 mm)
Migration solution: migration solution 5 (α-CF1105) for cation analysis manufactured by Otsuka Electronics Co., Ltd.
Measurement voltage: 20 kV (5) Next, the concentration of a cation in a film-shaped material after the step of bringing the film-shaped material into contact with water and/or an aqueous acidic solution was similarly measured, and a total value of the concentration was denoted by Y.

(6) The concentrations $C_3$ and $C_4$ of a salt component (cation) in a membrane were calculated based on the following equations.

$$C_3(\%) = W_W \times X/W_0 \times 100$$

$$C_4(\%) = W_W \times Y/W_0 \times 100$$

(3) Measurement of Concentration of Remaining Solvent in Film-Shaped Material

The concentration of a remaining solvent is determined by the calculation of the following equation when a weight of the film-shaped material measured before bringing the film-shaped material into contact with water and/or an aqueous acidic solution is denoted by W1, and a weight measured after the same film-shaped material was washed with warm water of 60° C. for 8 hours and dried at 100° C. for 8 hours in a vacuum is denoted by W2.

$$\text{Concentration of remaining solvent in film-shaped material(weight \%)} = (W1-W2)/W1 \times 100$$

(4) Weight Average Molecular Weight

A weight average molecular weight of a polymer was measured by GPC. Using HLC-8022GPC manufactured by TOSOH Corp. as an integrated-type apparatus of an ultraviolet detector and a differential refractometer and two TSK gel SuperHM-H (inner diameter: 6.0 mm, length: 15 cm) manufactured by TOSOH Corp. as a GPC column, a weight average molecular weight was measured on the standard polystyrene equivalent basis at a flow rate of 0.2 mL/min, using a N-methyl-2-pyrrolidone solvent (a N-methyl-2-pyrrolidone solvent containing 10 mmol/L of lithium bromide).

(5) Membrane Thickness

Using Model ID-C112 manufactured by Mitutoyo Corp. set to Granite Comparator Stand BSG-20 manufactured by Mitutoyo Corp., a membrane thickness was measured.

(6) Measurement of Viscosity

Using a rotating rheometer (rheometer RC 20 type manufactured by RHEOTECH Co., Ltd.), viscosity at 25° C. was measured under the condition of shear rate 100 ($s^{-1}$). Cone & Plate was used for a geometry (attachment for packing a sample), and values obtained by a software RHEO 2000 were adopted. C25-1 (2.5 cmφ) was used as a cone, and when measurement was difficult (viscosity less than 10 poise), C50-1 (5.0 cmφ) was used.

(7) Tensile Test

The electrolyte membrane was cut into a half-size of No. 2 type test piece to form a test piece according to JIS K 7127. Using "Autograph" manufactured by SHIMADZU CORP. as a measurement apparatus, stress at break (MPa) and elongation at break (%) were measured at a test speed of 20±2.0 mm/min.

(8) Fatigue Test of Electrolyte Membrane

Using an Electro-Magnetic Testing System "MMT-101N" manufactured by SHIMADZU CORP., a cycle test was carried out under the following conditions, and the number of cycles repeated before the electrolyte membrane was broken was investigated.

Test atmosphere: 25° C. 50% RH
Width of test piece: 5 mm
Kind of waveform: sine wave
Maximum stress: 20 MPa
Minimum stress: 2 MPa
Frequency: 100 Hz (9) Measurement of Structural Regularity of Electrolyte Membrane The structural regularity of the electrolyte membrane was measured by solid $^{13}$CDD/MAS NMR. A specimen was cut into a piece of 5 mm in width, packed in a solid NMR sample tube made of zirconia, and measured. Measurement conditions are shown below.

Structural regularity was determined by a full width (Hz) at half maximum of a peak of 133 ppm which is a main peak of aromatic, and when this value was smaller (peak was sharp), it was determined that the electrolyte membrane has higher structural regularity.

1) Apparatus: CMX-300 manufactured by Chemagnetics, Inc. AVANCE 400 manufactured by Bruker BioSpin K.K.
2) Measurement: DD/MAS method relaxation mode
3) Measurement angle: $^{13}$C
4) Observation frequency: 75.497791 MHz, 100.6248425 MHz
5) Pulse width: 4.2 µs, 3.3 µs
6) Observation width: 30.03 kHz, 40.00 kHz
7) Number of points: observation point 1024, data point 8192
8) Repetition time of pulse: PD: 150 s, 10 s
9) Chemical shift reference: silicone rubber (internal reference 1.56 ppm)
10) Number of revolutions of sample: 9 kHz, 14 kHz
11) Measurement temperature: room temperature

(10) Change Rate of Dimension (Direction of Plane)

An electrolyte membrane was cut out into a stripe of 6 cm×1 cm, and a marked line was drawn at a position about 5 millimeters from both ends in a longitudinal direction (distance between the marked lines was 5 cm). The sample was left standing in a thermostat bath of 23° C. and 45% in humidity for 2 hours and then sandwiched quickly between two slide glasses, and a distance between the marked lines ($L_1$) was measured with a vernier caliper. Moreover, the sample was immersed in hot water of 80° C. for 2 hours, and then sandwiched quickly between two slide glasses, and a distance between the marked lines ($L_2$) was measured with a vernier caliper, and the change rate of dimension was calculated according to the following equation.

$$\text{Change rate of dimension}(\%)=(L_2-L_1)/L_1\times100$$

(11) Gurley Permeability of Porous Film

The Gurley permeability (unit: seconds/100 ml) was measured at 23° C. at 65% relative humidity according to JIS P-8117. The same measurement was carried out five times on the same sample, and an average value of the resulting Gurley permeabilities was taken as a Gurley permeability of the sample.

(12) Porosity of Porous Film

A biaxially oriented film was cut out into square pieces, a length L (cm) of a side, a weight W (g) and a thickness D (cm) of the piece were measured, and the porosity of the porous film is determined by calculating the following equation:

$$\text{Porosity}(\%)=100-100(W/\rho)/(L2\times D),$$

wherein ρ represents a film density before stretching. A ρ value was determined according to D method (Density Gradient Tube Method) of JIS K 7112 (1980). As a solution for the density gradient tube at this time, ethanol and water were used.

(13) Evaluation of Power Generation
A. Measurement of Transmission Current Due to Hydrogen Permeation A gas diffusion electrode for a fuel cell "ELAT (registered trademark) LT120ENSI" 5 g/m² Pt manufactured by BASF corp., commercially available electrode, was cut into a size of 5 cm square to prepare a pair of the cut electrodes, and these two electrodes were overlaid on each other with an electrolyte membrane sandwiched therebetween, which were opposed to each other and act as a fuel electrode and an oxidation electrode, respectively. The electrodes were hot pressed at 50° C. at a pressure of 5 MPa for 3 minutes to obtain a membrane electrode assembly.

The membrane electrode assembly was set on JARI standard cell "Ex-1" (electrode area 25 cm²) manufactured by EIWA Corp., a cell temperature was maintained at 80° C., and a hydrogen was supplied to one electrode as fuel, and a nitrogen gas was supplied to the other electrode, a test was carried out under the high humidity conditions (hydrogen gas 90% RH, nitrogen gas 90% RH). A voltage was kept at 0.2 V or less at OCV, and swept at 1 mV/sec from 0.2 to 0.7 V to check changes in a current value. In the present examples, the current values at 0.6 V were measured before and after the following start/stop test. When the membrane is broken, an amount of hydrogen permeation increases and a transmission current increases. This evaluation was carried out by use of Solartron 1480 Electrochemical Interface and Solartron 1255B Frequency ResponseAnalyzer manufactured by Solartron.

B. Durability Test

Using the above-mentioned cell, a test was carried out under the conditions (cell temperature: 80° C., fuel gas: hydrogen, oxidizing gas: air, gas utilization: hydrogen 70%/oxygen 40%, humidity: hydrogen gas 60% RH, air 50% RH). A system was kept at OCV for 1 minute, electric is generated at a current density of 1 A/cm² for 2 minutes, and finally supplies of a hydrogen gas and air were stopped to stop electric generation for 2 minutes, and this cycle was taken as 1 cycle. A durability test to repeat this cycle was carried out. The above-mentioned transmission current due to hydrogen permeation was measured before the durability test and after 3000 cycles, and difference between these measurements was investigated. Further, load in the durability test was varied by use of Electronic Load equipment "PLZ 664WA" manufactured by KIKUSUI ELECTRONICS CORP.

C. Evaluation of Electric Generation Under Low Humidity Conditions

Current-Voltage (I-V) of the above fuel cell were measured under the conditions (cell temperature: 80° C., fuel gas: hydrogen, oxidizing gas: air, gas utilization: hydrogen 70%/oxygen 40%, humidity: anode side 30% RH/cathode 30% RH, back pressure (0.1 MPa at both sides)). A value of a point where the product of the current and the voltage of a Current-Voltage curve becomes maximum divided by an electrode area was taken as an output density.

Synthesis Example 1

Monomer Having Ionic Group

Synthesis of Disodium 3,3'-disulfonate-4,4'-difluorobenzophenone (G2)

[Chemical Formula 2]

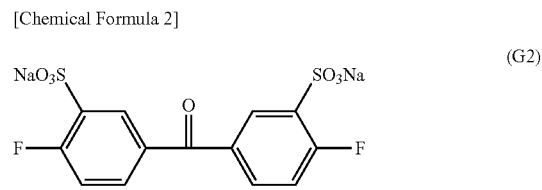

(G2)

109.1 g of 4,4'-difluorobenzophenone (Aldrich reagent) was reacted at 100° C. for 10 hours in 150 ml of a fuming sulfuric acid (50% SO₃) (manufactured by Wako Pure Chemical Industries, Ltd.). Thereafter, the reactant was charged into a large amount of water little by little, and the resulting mixture was neutralized with NaOH, and to this, 200 g of common salt was added to precipitate a synthetic product. The resulting precipitate was filtered and then recrystallized from an aqueous ethanol solution to obtain disodium 3,3'-disulfonate-4,4'-difluorobenzophenone.

Synthesis Example 2

Monomer Having Hydrolytic Group for Imparting Solubility

Synthesis of 2,2-bis(4-hydroxyphenyl)-1,3-dioxolane (G1)

[Chemical Formula 3]

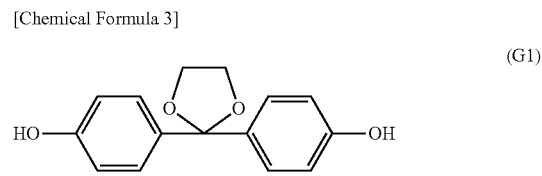

(G1)

Montmorillonite clay K10 (150 g) was reacted with 99 g of dihydroxybenzophenone at 110° C. in a mixture of 242 ml of ethylene glycol/99 ml of trimethyl orthoformate while distilling a produced by-product. After a lapse of 18 hours, 66 g of trimethyl orthoformate was added to perform a synthetic reaction for 48 hours. 300 ml of ethyl acetate was added to a reactant solution, and the resulting mixture was filtered and extracted with a 2% aqueous solution of sodium hydrogen carbonate four times. Furthermore, the reactant was concentrated, and then recrystallized with dichloroethane to obtain desired 2,2-bis(4-hydroxyphenyl)-1,3-dioxolane.

Reference Example 1

Production Example of Polymerization Stock Solution A for Polymer Electrolyte Having Ionic Group Density of 2 mmol/g or More Into a 6 L reaction vessel equipped with a stirrer, a nitrogen introducing tube and a Dean-Stark trap, 235 g of potassium carbonate (1.7 mol of Aldrich reagent), 352 g (1.0 mol) of 4,4'-dihydroxytetraphenylmethane, 65 g of 4,4'-difluorobenzophenone (0.3 mol of Aldrich reagent), and 296 g (0.7 mol) of disodium 3,3'-disulfonate-4,4'-difluorobenzophenone which was a monomer containing an ionic group were charged, and after the atmosphere in the vessel was replaced with nitrogen, 3800 g of N-methyl-2-pyrrolidone (NMP) and 550 g of toluene were added, and the resulting mixture was dehydrated at 160° C. while being refluxed, and then the dehydrated content was heated to remove toluene and desalting/polycondensation was carried out at 200° C. for 1 hour. The resulting polymer had a stoichiometric value of an ionic group density of 2.22 mmol/g and a weight average molecular weight of 210000. Next, a polymerization stock solution A was prepared by adding NMP in such a way that the viscosity of a polymerization stock solution is 0.5 Pa·s.

Reference Example 2

Production Example of Polymerization Stock Solution B for Polymer Electrolyte Having Ionic Group Density of 2 mmol/g or More)

Into a . . . a stirrer, a nitrogen . . . , 221 g . . . (1.6 mol of Aldrich reagent), 252 g of 4,4'-dihydroxydiphenylsulfone (bisphenol S) (1.0 mol of a reagent manufactured by TOKYO CHEMICAL INDUSTRY Co., Ltd.), 87 g of 4,4'-difluorobenzophenone (0.4 mol of Aldrich reagent), and 253 g (0.6 mol) of disodium 3,3'-disulfonate-4,4'-difluorobenzophenone which was a monomer containing an ionic group were charged, and after the atmosphere in the vessel was replaced with nitrogen, 3200 g of N-methyl-2-pyrrolidone (NMP) and 450 g of toluene were added, and the resulting mixture was dehydrated at 160° C. while being refluxed, and then the dehydrated content was heated to remove toluene and desalting/polycondensation was carried out at 200° C. for 1 hour. The resulting polymer had a stoichiometric value of an ionic group density of 2.28 mmol/g and a weight average molecular weight of 210000. Next, a polymerization stock solution B was prepared by adding N-methyl-2-pyrrolidone in such a way that the viscosity of a polymerization stock solution is 0.5 Pa·s.

Reference Example 3

Production Example of Polymerization Stock Solution C for Polymer Electrolyte Having Ionic Group Density of 2 mmol/g or More and Group for Imparting Solubility)

Into a 5 L reaction vessel equipped with a stirrer, a nitrogen introducing tube and a Dean-Stark trap, 221 g of potassium carbonate (1.6 mol of Aldrich reagent), 37 g of 4,4'-biphenol (0.5 mol of Aldrich reagent), 207 g (0.8 mol) of 2,2-bis(4-hydroxyphenyl)-1,3-dioxolane, 87 g of 4,4'-difluorobenzophenone (0.4 mol of Aldrich reagent), and 253 g (0.6 mol) of disodium 3,3'-disulfonate-4,4'-difluorobenzophenone which was a monomer containing an ionic group were charged, and after the atmosphere in the vessel was replaced with nitrogen, 3200 g of N-methyl-2-pyrrolidone (NMP) and 500 g of toluene were added, and the resulting mixture was dehydrated at 160° C. while being refluxed, and then the dehydrated content was heated to remove toluene and desalting/polycondensation was carried out at 200° C. for 1 hour. The resulting polymer had a stoichiometric value of an ionic group density of 2.49 mmol/g and a weight average molecular weight of 320000. Next, a polymerization stock solution C was prepared by adding NMP in such a way that the viscosity of a polymerization stock solution is 0.5 Pa·s.

Reference Example 4

Production Example of Polymerization Stock Solution D for Polymer Electrolyte Having Ionic Group Density of 2 mmol/g or More and Group for Imparting Solubility)

Into a 5 L reaction vessel equipped with a stirrer, a nitrogen introducing tube and a Dean-Stark trap, 43 g of 4,4'-dihydroxybenzophenone (0.2 mol of Aldrich reagent), 207 g (0.8 mol) of 2,2-bis(4-hydroxyphenyl)-1,3-dioxolane, 87 g of 4,4'-difluorobenzophenone (0.2 mol of Aldrich reagent), and 338 g (0.8 mol) of disodium 3,3'-disulfonate-4,4'-difluorobenzophenone which was a monomer containing an ionic group were charged, and after the atmosphere in the vessel was replaced with nitrogen, 2500 g of N-methyl-2-pyrrolidone (NMP), 500 g of toluene, and 186 g of 18-crown-6 (manufactured by Wako Pure Chemical Industries, Ltd.) as a cyclic metal scavenger were added. After confirming that all monomers were dissolved, 248 g of potassium carbonate (1.8 mol of Aldrich reagent) was added, and the resulting mixture was dehydrated at 160° C. while being refluxed, and then the dehydrated content was heated to remove toluene and desalting/polycondensation was carried out at 200° C. for 1 hour. The resulting polymer had a stoichiometric value of an ionic group density of 3.08 mmol/g and a weight average molecular weight of 280000. Next, a polymerization stock solution D was prepared by adding NMP in such a way that the viscosity of a polymerization stock solution is 0.5 Pa·s.

Reference Example 5

Production Example of Polymerization Stock Solution E for Polymer Electrolyte Having Ionic Group Density of 2 mmol/g or More and Group for Imparting Solubility Into a 5 L reaction vessel equipped with a stirrer, a nitrogen introducing tube and a Dean-Stark trap, 43 g of 4,4'-dihydroxybenzophenone (0.2 mol of Aldrich reagent), 207 g (0.8 mol) of 2,2-bis(4-hydroxyphenyl)-1,3-dioxolane, 93 g of 4,4'-biphenol (0.5 mol of Aldrich reagent), and 422 g (1.0 mol) of disodium 3,3'-disulfonate-4,4'-difluorobenzophenone which was a monomer containing an ionic group were charged, and after the atmosphere in the vessel was replaced with nitrogen, 3000 g of N-methyl-2-pyrrolidone (NMP), 450 g of toluene, and 232 g of 18-crown-6 (manufactured by Wako Pure Chemical Industries, Ltd.) as a cyclic metal scavenger were added. After confirming that all monomers were dissolved, 276 g of potassium carbonate (2.0 mol of Aldrich reagent) was added, and the resulting mixture was dehydrated at 160° C. while being refluxed, and then the dehydrated content was heated to remove toluene and desalting/polycondensation was carried out at 190° C. for 1 hour. The resulting polymer had a stoichiometric value of an ionic group density of 3.72 mmol/g and a weight average molecular weight of 360000. Next, a polymerization stock solution E was prepared by adding NMP in such a way that the viscosity of a polymerization stock solution is 0.5 Pa·s.

Reference Example 6

Production Example of Polymerization Stock Solution F for Polymer Electrolyte Having Ionic Group Density of 2 mmol/g or More and Group for Imparting Solubility Into a 5 L reaction vessel equipped with a stirrer, a nitrogen introducing tube and a Dean-Stark trap, 43 g of 4,4'-dihydroxybenzophenone (0.2 mol of Aldrich reagent), 207 g (0.8 mol) of 2,2-bis(4-hydroxyphenyl)-1,3-dioxolane, 87 g of 4,4'-difluorobenzophenone (0.2 mol of Aldrich reagent), and 338 g (0.8 mol) of disodium 3,3'-disulfonate-4,4'-difluorobenzophenone which was a monomer containing an ionic group were charged, and after the atmosphere in the vessel was replaced with nitrogen, 2500 g of N-methyl-2-pyrrolidone (NMP), 500 g of toluene, 100 g of ethylene glycol and 50 g of polyethylene glycol having a molecular weight of 400 as glycols, and 248 g of potassium carbonate (1.8 mol of Aldrich reagent) were added, and the resulting mixture was dehydrated at 160° C. while being refluxed, and then the dehydrated content was heated to remove toluene and desalting/polycondensation was carried out at 200° C. for 1 hour. The resulting polymer had a stoichiometric value of an ionic group density of 3.08 mmol/g and a weight average molecular weight of 200000. Next, a polymerization stock solution F was prepared by adding NMP in such a way that the viscosity of a polymerization stock solution is 0.5 Pa·s.

Example 1

Direct centrifugal separation of the polymerization stock solution A was performed using an inverter type compact high speed refrigerated centrifuge (an angle rotor RA-800 was set up in a model no. 6930 and a centrifuge was operated at 25° C. for 30 minutes at a centrifugal force of 20000 G) manufactured by KUBOTA Corp. Since a settled solid substance (cake) and a supernatant solution (coating solution) were clearly separated, the supernatant solution was recovered and shifted to a separable flask through a polytetrafluoroethylene (PTFE) filter having a pore size of 10 μm while pressure-filtering. Then, the supernatant solution was distilled at 80° C. under a reduced pressure while being stirred to remove NMP until the viscosity of the supernatant solution was 2 Pa·s, and the supernatant solution was further pressure-filtered using a polytetrafluoroethylene (PTFE) filter having a pore size of 5 μm to obtain a coating solution A.

A PET film ("Lumirror (registered trademark)" manufactured by Toray Industries Inc.) of 125 μm in thickness was used as a substrate, and the coating solution A was continuously applied onto the film by casting with a coater (coating portion; slit die coater) capable of continuous coating. An application rate was a rate in which the coating solution can be dried for 10 minutes at 140° C. in the step of evaporating a solvent, and application conditions were adjusted in such a way that a thickness of an electrolyte membrane after evaporation of the solvent was 20 μl, and a film-shaped material was taken up into a roll.

A part of the roll was cut out and a film-shaped material was peeled off from the substrate. In this time, there was no problem in a peeling property of the film-shaped material and curling, wrinkles or surface defects did not occur. A part of the film-shaped material was sampled and the concentration of a remaining solvent in the membrane was measured, and consequently the concentration was 25% by weight. Further, a salt concentration $C_3$ was 1.2% and a salt component could be adequately removed.

Next, the film-shaped material was immersed in pure water of 25° C. for 10 minutes without peeling off from the PET, and then immersed in 10 weight % sulfuric acid of 60° C. for 30 minutes to perform proton exchange of an ionic group.

Then, the film-shaped material was washed with pure water until the pure water used for washing was neutral, and dried at 60° C. for 30 minutes to obtain an electrolyte membrane A having a thickness of 15 μm. The electrolyte membrane had an ionic group density of 2.01 mmol/g (90.5% of a stoichiometric value) and a salt concentration $C_4$ of 0.1%, and a ratio of $C_3$ to $C_4$ was 0.08, and therefore removal of a salt component in the electrolyte membrane was sufficient.

A fatigue test was performed by use of the electrolyte membrane A, and consequently the electrolyte membrane exhibited the durability of 2500000 times, stress at break of 81 (MPa) and elongation at break of 190(%), and had excellent mechanical characteristics without being affected by a remaining salt.

Example 2

Direct centrifugal separation was carried out in the same manner as in Example 1 except that the polymerization stock solution B was used in place of the polymerization stock solution A and a centrifugal force was set at 5000 G to obtain a coating solution B.

A PET film ("Lumirror (registered trademark)" manufactured by Toray Industries Inc.) of 125 μm in thickness was used as a substrate, and the coating solution B was continuously applied onto the film by casting with a coater (coating portion; Comma coater) capable of continuous coating. An application rate was a rate in which the coating solution can be dried for 15 minutes at 160° C. in the step of evaporating a solvent, and application conditions were adjusted in such a way that a thickness of an electrolyte membrane after evaporation of the solvent was 20 μl, and a film-shaped material was taken up into a roll.

A part of the roll was cut out and a film-shaped material was peeled off from the substrate. In this time, there was no problem in a peeling property of the film-shaped material and curling, wrinkles or surface defects did not occur. A part of the film-shaped material was sampled and the concentration of a remaining solvent in the membrane was measured, and consequently the concentration was 10% by weight. Further, a salt concentration $C_3$ was 4.9% and a salt component could be adequately removed.

Next, the film-shaped material was immersed in pure water of 25° C. for 10 minutes without peeling off from the PET, and then immersed in 10 weight % sulfuric acid of 60° C. for 30 minutes to perform proton exchange of an ionic group.

Then, the film-shaped material was washed with pure water until the pure water used for washing was neutral, and dried at 60° C. for 30 minutes to obtain an electrolyte membrane B having a thickness of 18 μm. The electrolyte membrane had an ionic group density of 2.02 mmol/g (88.60 of a stoichiometric value) and a salt concentration $C_4$ of 0.15%, and a ratio of $C_3$ to $C_4$ was 0.03, and therefore removal of a salt component in the electrolyte membrane was sufficient.

A fatigue test was performed by use of the electrolyte membrane B, and consequently the electrolyte membrane exhibited the durability of 2480000 times, stress at break of 78 (MPa) and elongation at break of 210(%), and had excellent mechanical characteristics without being affected by a remaining salt.

Comparative Example 1

The polymerization stock solution A was left standing for a week, and a supernatant solution was recovered without performing centrifugal separation and shifted to a separable flask. Then, the supernatant solution was distilled at 80° C. under a reduced pressure while being stirred to remove NMP directly until the viscosity of the supernatant solution was 2 Pa·s, and the supernatant solution was further pressure-filtered using a polytetrafluoroethylene (PTFE) filter having a pore size of 5 μm to obtain a coating solution A'.

A film-shaped material having a thickness of 20 μm was prepared in the same manner as in Example 1 using the coating solution A' as a coating solution. A salt concentration $C_3$ at this point was 6.8% and removal of a salt component was insufficient.

Next, the film-shaped material was immersed in pure water of 25° C. for 10 minutes without peeling off from the PET, and then immersed in 10 weight % sulfuric acid of 60° C. for 30 minutes to perform proton exchange of an ionic group.

Then, the film-shaped material was washed with pure water until the pure water used for washing was neutral, and dried at 60° C. for 30 minutes to obtain an electrolyte membrane A' having a thickness of 15 μm. The electrolyte membrane had an ionic group density of 2.0 mmol/g (90.5% of a stoichiometric value) and a salt concentration $C_4$ of 2.1%, and a ratio of $C_3$ to $C_4$ was 0.31, and therefore a salt component in the electrolyte membrane remained.

A fatigue test was performed by use of the electrolyte membrane A', and consequently the electrolyte membrane exhibited the durability of 300000 times and its durability was lower than that of Example 1 in which centrifugal separation was performed. Further, its stress at break was 45 (MPa) and elongation at break was 40(%), and mechanical characteristics were deteriorated by influence of a remaining salt.

Example 3

Using a super-high speed centrifugal separator model VHF 1001 manufactured by Kansai Centrifugal Separator M.f.g. Co., Ltd., the polymerization stock solution C was directly supplied at a rate of 100 g/min, and centrifugal separation was continuously carried out at a centrifugal force of 18000 G. A permeated solution was recovered, shifted to a separable flask, and distilled at 120° C. under a reduced pressure while being stirred to remove NMP until the viscosity of a supernatant solution was 12 Pa·s. The supernatant solution was pressure-filtered using a polytetrafluoroethylene (PTFE) filter having a pore size of 3 μm to obtain a coating solution C.

A PET film ("Lumirror (registered trademark)" manufactured by Toray Industries Inc.) of 125 μm in thickness was used as a substrate, and the coating solution C was continuously applied onto the film by casting with a coater (coating portion; slit die coater) capable of continuous coating. An application rate was a rate in which the coating solution can be dried for 15 minutes at 150° C. in the step of evaporating a solvent, and application conditions were adjusted in such a way that a thickness of an electrolyte membrane after evaporation of the solvent was 20 μl, and a film-shaped material was taken up into a roll.

A part of the roll was cut out and a film-shaped material was peeled off from the substrate. In this time, there was no problem in a peeling property of the film-shaped material and curling, wrinkles or surface defects did not occur. A part of the film-shaped material was sampled and the concentration of a remaining solvent in the membrane was measured, and consequently the concentration was 12% by weight. Further, a salt concentration $C_3$ was 3.4% and a salt component could be adequately removed.

Next, the film-shaped material was immersed in 10 weight % sulfuric acid of 60° C. for 30 minutes without peeling off from the PET to perform hydrolysis of a hydrolytic soluble group and proton exchange of an ionic group.

Then, the film-shaped material was washed with pure water until the pure water used for washing was neutral, and dried at 60° C. for 30 minutes to obtain an electrolyte membrane C having a thickness of 15 μl. The electrolyte membrane C had an ionic group density of 2.25 mmol/g (90.4% of a stoichiometric value) and a salt concentration $C_4$ of 0.11%, and a ratio of $C_3$ to $C_4$ was 0.03, and therefore removal of a salt component in the electrolyte membrane was sufficient.

A fatigue test was performed by use of the electrolyte membrane C, and consequently the electrolyte membrane exhibited the durability of 2800000 times, stress at break of 75 (MPa) and elongation at break of 205(%), and had excellent mechanical characteristics without being affected by a remaining salt. Further, in solid $^{13}$C-NMR spectrum, a peak of 133 ppm, which is a measure of structural regularity of the electrolyte membrane C, had a full width at half maximum of 580 Hz and the electrolyte membrane C had high structural regularity.

Example 4

Using a super-high speed centrifugal separator model VHF 1001 manufactured by Kansai Centrifugal Separator M.f.g. Co., Ltd., the polymerization stock solution C was directly supplied at a rate of 100 g/min, and centrifugal separation was continuously carried out at a centrifugal force of 15000 G. A permeated solution was recovered and shifted to a separable flask, and to this, 100 g of 18-crown-6 (manufactured by Wako Pure Chemical Industries, Ltd.) as a cyclic metal scavenger was added, and the resulting mixture was distilled at 120° C. under a reduced pressure while being stirred to remove NMP until the viscosity of a supernatant solution was 12 Pa·s. The supernatant solution was pressure-filtered using a polytetrafluoroethylene (PTFE) filter having a pore size of 3 μm to obtain a coating solution C'.

A PET film ("Lumirror (registered trademark)" manufactured by Toray Industries Inc.) of 125 μm in thickness was used as a substrate, and the coating solution C' was continuously applied onto the film by casting with a coater (coating portion; slit die coater) capable of continuous coating. An application rate was a rate in which the coating solution can be dried for 10 minutes at 140° C. in the step of evaporating a solvent, and application conditions were adjusted in such a way that a thickness of an electrolyte membrane after evaporation of the solvent was 23 μm, and a film-shaped material was taken up into a roll.

A part of the roll was cut out and a film-shaped material was peeled off from the substrate. In this time, there was no problem in a peeling property of the film-shaped material and curling, wrinkles or surface defects did not occur. A part of the film-shaped material was sampled and the concentration of a remaining solvent in the membrane was measured, and consequently the concentration was 25% by weight. Further, a salt concentration $C_3$ was 3.8% and a salt component could be adequately removed.

Next, the film-shaped material was immersed in 10 weight % sulfuric acid of 60° C. for 30 minutes without peeling off from the PET to perform hydrolysis of a hydrolytic soluble group and proton exchange of an ionic group.

Then, the film-shaped material was washed with pure water until the pure water used for washing was neutral, and dried at 60° C. for 30 minutes to obtain an electrolyte membrane C' having a thickness of 15 µm. The electrolyte membrane C' had anionic group density of 2.25 mmol/g (90.4% of a stoichiometric value) and a salt concentration $C_4$ of 0.02%, and a ratio of $C_3$ to $C_4$ was 0.005, and an amount of a salt component in the electrolyte membrane was extremely small.

A fatigue test was performed by use of the electrolyte membrane C', and consequently the electrolyte membrane exhibited the durability of 3700000 times, stress at break of 80 (MPa) and elongation at break of 265(%), and had excellent mechanical characteristics without being affected by a remaining salt. Further, in solid $^{13}$C-NMR spectrum, a peak of 133 ppm, which is a measure of structural regularity of the electrolyte membrane C', had a full width at half maximum of 545 Hz and the electrolyte membrane C' had high structural regularity.

Comparative Example 2

The polymerization stock solution C was added gradually to a largely excessive amount of water to perform purification by precipitation. In this time, since swelling of a precipitated polymer electrolyte is large, cleaning of a salt component could not be adequately carried out and workability was extremely low. A precipitated polymer was separated by filtration using a filter fabric, drained, and dried at 80° C. for 12 hours under a reduced pressure. After the polymer was dissolved in NMP again to form a coating solution having viscosity of 12 Pa·s, the coating solution was pressure-filtered using a polytetrafluoroethylene (PTFE) filter having a pore size of 3 µm, but since filtration was difficult because of a gel portion insoluble in a solvent, the filter was changed to a filter having a pore size of 10 µm and the coating solution was pressure-filtered to obtain a coating solution C".

A PET film ("Lumirror (registered trademark)" manufactured by Toray Industries Inc.) of 125 µm in thickness was used as a substrate, and the coating solution C" was continuously applied onto the film by casting with a coater (coating portion; slit die coater) capable of continuous coating. Vertical streaks were easily produced due to an extraneous material resulting from gel even immediately after the application.

An application rate was a rate in which the coating solution can be dried for 15 minutes at 150° C. in the step of evaporating a solvent, and application conditions were adjusted in such a way that a thickness of an electrolyte membrane after evaporation of the solvent was 20 µl, and a film-shaped material was taken up into a roll.

A part of the roll was cut out and a film-shaped material was peeled off from the substrate. In this time, a surface defect starting from a gel-like extraneous material was produced during peeling. A part of the film-shaped material was sampled and the concentration of a remaining solvent in the membrane was measured, and consequently the concentration was 25% by weight. Further, a salt concentration $C_3$ was 7.8% and a salt component was insufficient.

Next, a dried film was peeled off from the PET, and immersed in pure water of 25° C. for 10 minutes to clean remaining NMP, and then immersed in 10 weight % sulfuric acid of 60° C. for 30 minutes to perform hydrolysis of a hydrolytic soluble group and proton exchange of an ionic group.

Then, the film was washed with pure water until the pure water used for washing was neutral, and dried at 60° C. for 30 minutes to obtain an electrolyte membrane C" having a thickness of 17 µm. The electrolyte membrane C" became slightly cloudy all over, and became prominently cloudy and semi-transparent when immersing in water. Further, in solid $^{13}$C-NMR spectrum, a peak of 133 ppm, which determines structural regularity of the membrane, had a half width of 780 Hz.

A fatigue test was performed by use of the electrolyte membrane C", and consequently the electrolyte membrane exhibited the durability of 50000 times by influence of a gelled substance and its durability was lower than those of Examples 3 and 4 in which centrifugal separation was performed. Further, its stress at break was 41 (MPa) and elongation at break was 19(%), and mechanical characteristics were deteriorated by influence of a remaining salt.

Example 5

Using a super-high speed centrifugal separator model VHF 1001 manufactured by Kansai Centrifugal Separator M.f.g. Co., Ltd., the polymerization stock solution D was directly supplied at a rate of 100 g/min, and centrifugal separation was continuously carried out at a centrifugal force of 20000 G. A permeated solution was recovered, shifted to a separable flask, and distilled at 120° C. under a reduced pressure while being stirred to remove NMP until the viscosity of a supernatant solution was 5 Pa·s. The supernatant solution was pressure-filtered using a polytetrafluoroethylene (PTFE) filter having a pore size of 3 µm to obtain a coating solution D.

A PET film ("Lumirror (registered trademark)" manufactured by Toray Industries Inc.) of 125 µm in thickness was used as a substrate, and the coating solution D was continuously applied onto the film by casting with a coater (coating portion; slit die coater) capable of continuous coating. An application rate was a rate in which the coating solution can be dried for 15 minutes at 150° C. in the step of evaporating a solvent, and application conditions were adjusted in such a way that a thickness of an electrolyte membrane after evaporation of the solvent was 18 µm, and a film-shaped material was taken up into a roll.

A part of the roll was cut out and a film-shaped material was peeled off from the substrate. In this time, there was no problem in a peeling property of the film-shaped material and curling, wrinkles or surface defects did not occur. A part of the film-shaped material was sampled and the concentration of a remaining solvent in the film was measured, and consequently the concentration was 25% by weight. Further, a salt concentration $C_3$ was 1.0% and a salt component could be adequately removed.

Next, the film-shaped material was immersed in 10 weight % sulfuric acid of 60° C. for 30 minutes without peeling off from the PET to perform hydrolysis of a hydrolytic soluble group and proton exchange of an ionic group.

Then, the film-shaped material was washed with pure water until the pure water used for washing was neutral, and dried at 60° C. for 30 minutes to obtain an electrolyte membrane D having a thickness of 15 µm. The electrolyte membrane D had an ionic group density of 2.93 mmol/g (95.0% of a stoichiometric value) and a salt concentration $C_4$ of 0.01%, and a ratio of $C_3$ to $C_4$ was 0.1, and removal of a salt component in the electrolyte membrane was sufficient.

A fatigue test was performed by use of the electrolyte membrane D, and consequently the electrolyte membrane exhibited the durability of 3900000 times, stress at break of 69 (MPa) and elongation at break of 320(%), and had excellent mechanical characteristics without being affected by a remaining salt. Further, in solid $^{13}$C-NMR spectrum, a peak of 133 ppm, which is a measure of structural regularity of the electrolyte membrane D, had a full width at half maximum of 550 Hz and the electrolyte membrane D had high structural regularity.

Comparative Example 2

The polymerization stock solution D was added gradually to a largely excessive amount of water to perform purification by precipitation. In this time, since swelling of a precipitated polymer electrolyte is extremely large, separation between the polymer and water could not be achieved. A part of a solution of swelled polymer was sampled, and a film-shaped material was prepared by applying the sampled solution by casting to evaporate water. However, since a salt component was not removed, the membrane became cloudy and a salt component concentration $C_3$ in the membrane was 26.0.

Example 6

A coating solution E was prepared in the same manner as in Example 5 except for changing the polymerization stock solution D in Example 5 to the polymerization stock solution E. By use of the coating solution E, a film-shaped material was prepared with the continuous application system by casting for producing an assembled polymer electrolyte membrane, a schematic view of a constitution of which is shown in FIG. 3. A PET film ("Lumirror (registered trademark)" manufactured by Toray Industries Inc.) of 125 μm in thickness was used as a substrate, and a biaxially oriented polypropylene film, which had a porosity of 70%, a Gurley permeability of 200 seconds/100 ml and a thickness of 20 μm, was used as a porous film.

A slit die method was employed for a portion 3 of applying by casting, and an application rate was a rate in which the coating solution can be dried for 15 minutes at 100° C. in the step of evaporating a solvent, and application conditions were adjusted in such a way that a thickness of a film-shaped material after evaporation of the solvent was 22 μm, and the film-shaped material was taken up into a roll. A part of the roll was cut out and a film-shaped material was peeled off from the substrate. In this time, there was no problem in a peeling property of the film-shaped material and curling, wrinkles or surface defects did not occur. A part of the film-shaped material was sampled and the concentration of a remaining solvent in the membrane was measured, and consequently the concentration was 29% by weight. Further, a salt concentration $C_3$ was 1.0% and a salt component could be adequately removed.

Next, the film-shaped material was immersed in 10 weight % sulfuric acid of 40° C. for 30 minutes without peeling off from the PET to perform hydrolysis of a hydrolytic soluble group and proton exchange of an ionic group.

Then, the film-shaped material was washed with pure water until the pure water used for washing was neutral, and dried at 60° C. for 30 minutes to obtain an assembled polymer electrolyte membrane A having a thickness of 20 μm. The assembled polymer electrolyte membrane A had an ionic group density of 2.20 mmol/g and a salt concentration $C_4$ of 0.01%, and a ratio of $C_3$ to $C_4$ was 0.1, and removal of a salt component in the electrolyte membrane was sufficient.

A change rate of dimension was measured by use of the assembled polymer electrolyte membrane A, and consequently the change rate was 2.0%. Further, in solid $^{13}$C-NMR spectrum, a peak of 133 ppm, which is a measure of structural regularity of a polymer electrolyte in the assembled polymer electrolyte membrane A, had a full width at half maximum of 590 Hz and the assembled polymer electrolyte membrane A had high structural regularity. Further, an output under low humidity conditions of a fuel cell using the assembled polymer electrolyte membrane A was 580 mW/cm$^2$, and a transmission current due to hydrogen permeation before and after an evaluation test of power generation durability was measured, and consequently the transmission current was 0.35 mA/cm$^2$ before the evaluation and 0.40 mA/cm$^2$ after the evaluation, and the durability of the electrolyte membrane A was good.

Example 7

By use of the coating solution E in Example 6, a film-shaped material was prepared with the continuous application system by casting for producing an assembled polymer electrolyte membrane, a schematic view of a constitution of which is shown in FIG. 6. A PET film ("Lumirror (registered trademark)" manufactured by Toray Industries Inc.) of 125 μm in thickness was used as a substrate, and a film having a Gurley permeability of 50 seconds/100 ml and a thickness of 5 μl, which was formed by splitting, into two layers in a thickness direction, a biaxially oriented polypropylene film having a porosity of 60%, a Gurley permeability of 250 seconds/100 ml and a thickness of 25 μl, was used as a porous film.

A slit die method was employed for a portions 3A and 3B of applying by casting, and an application rate was a rate in which a drying portion 4A can be dried for 15 minutes at 100° C. and a drying portion 4B can be dried for 15 minutes at 130° C., and application conditions were adjusted in such a way that a thickness of a film-shaped material after evaporation of the solvent was 13 μm, and the film-shaped material was taken up into a roll. A part of the roll was cut out and a film-shaped material was peeled off from the substrate. In this time, there was no problem in a peeling property of the film-shaped material and curling, wrinkles or surface defects did not occur. A part of the film-shaped material was sampled and the concentration of a remaining solvent in the membrane was measured, and consequently the concentration was 15% by weight. Further, a salt concentration $C_3$ was 0.8% and a salt component could be adequately removed.

Next, the film-shaped material was immersed in 10 weight % sulfuric acid of 40° C. for 30 minutes without peeling off from the PET to perform hydrolysis of a hydrolytic soluble group and proton exchange of an ionic group.

Then, the film-shaped material was washed with pure water until the pure water used for washing was neutral, and dried at 60° C. for 30 minutes to obtain an assembled polymer electrolyte membrane B having a thickness of 10 μm. The assembled polymer electrolyte membrane B had an ionic group density of 2.80 mmol/g and a salt concentration $C_4$ of 0.05%, and a ratio of $C_3$ to $C_4$ was 0.06, and removal of a salt component in the electrolyte membrane was sufficient.

A change rate of dimension was measured by use of the assembled polymer electrolyte membrane B, and consequently the change rate was 2.5%. Further, in solid $^{13}$C-NMR spectrum, a peak of 133 ppm, which is a measure of structural regularity of a polymer electrolyte in the assembled polymer electrolyte membrane B, had a full width at half maximum of 580 Hz and the assembled polymer electrolyte membrane A had high structural regularity. Further, an output under low humidity conditions of a fuel cell using the assembled polymer electrolyte membrane B was 610 mW/cm$^2$, and a transmission current due to hydrogen permeation before and after an evaluation test of power generation durability was measured, and consequently the transmission current was 0.55 mA/cm$^2$ before the evaluation and 0.58 mA/cm$^2$ after the evaluation, and the durability of the electrolyte membrane B was good.

Comparative Example 3

The polymerization stock solution E was added gradually to a largely excessive amount of water to perform purification by precipitation. In this time, since an ion exchange capacity of a polymer electrolyte is too large, the polymer electrolyte was dissolved in water and could not be purified. A solution was sampled, and a film-shaped material was prepared by applying the sampled solution by casting to evaporate water. However, since a salt component was not removed, the membrane became cloudy and a salt component concentration $C_3$ in the membrane was 32.0%, and this purification method was inferior to the centrifugation method in Examples 6 and 7.

Comparative Example 4

An assembled polymer electrolyte membrane C was prepared in the same manner as in Example 6 except for using a biaxially oriented polypropylene film, which had a porosity of 50%, a Gurley permeability of 500 seconds/100 ml and a thickness of 20 μm, in place of the porous film in Example 6. The assembled polymer electrolyte membrane C had an ionic group density of 1.23 mmol/g. Further, an output under low humidity conditions of a fuel cell using the assembled polymer electrolyte membrane C was 40 mW/cm$^2$, and the output was evidently lower than that of Example 6.

Example 8

Using a super-high speed centrifugal separator model VHF 1001 manufactured by Kansai Centrifugal Separator M.f.g. Co., Ltd., the polymerization stock solution F was directly supplied at a rate of 100 g/min, and centrifugal separation was continuously carried out at a centrifugal force of 8000 G. The separated solution was directly pressure-filtered using a polytetrafluoroethylene (PTFE) filter having a pore size of 100 μl, and a filtrate was shifted to a separable flask, and distilled at 120° C. under a reduced pressure while being stirred to remove NMP until the viscosity of a supernatant solution was 5 Pa·s to obtain a coating solution F.

A PET film ("Lumirror (registered trademark)" manufactured by Toray Industries Inc.) of 125 μm in thickness was used as a substrate, and the coating solution F was continuously applied onto the film by casting with a coater (coating portion; slit die coater) capable of continuous coating. An application rate was a rate in which the coating solution can be dried for 10 minutes at 130° C. in the step of evaporating a solvent, and application conditions were adjusted in such a way that a thickness of an electrolyte membrane after evaporation of the solvent was 25 μl, and a film-shaped material was taken up into a roll.

A part of the roll was cut out and a film-shaped material was peeled off from the substrate. In this time, there was no problem in a peeling property of the film-shaped material and curling, wrinkles or surface defects did not occur. A part of the film-shaped material was sampled and the concentration of a remaining solvent in the membrane was measured, and consequently the concentration was 42% by weight. Further, a salt concentration $C_3$ was 4.0% and a salt component could be adequately removed.

Next, the film-shaped material was peeled off from the PET and immersed in 10 weight % sulfuric acid of 60° C. for 30 minutes to perform hydrolysis of a hydrolytic soluble group and proton exchange of an ionic group.

Then, the film-shaped material was washed with pure water until the pure water used for washing was neutral, and dried at 60° C. for 30 minutes to obtain an electrolyte membrane E having a thickness of 15 μl. The electrolyte membrane E had an ionic group density of 2.93 mmol/g (95.0% of a stoichiometric value) and a salt concentration $C_4$ of 0.03%, and a ratio of $C_3$ to $C_4$ was 0.008, and therefore removal of a salt component in the electrolyte membrane was sufficient.

A fatigue test was performed by use of the electrolyte membrane F, and consequently the electrolyte membrane exhibited the durability of 2000000 times, stress at break of 61 (MPa) and elongation at break of 270(%), and had excellent mechanical characteristics without being affected by a remaining salt. Further, in solid $^{13}$C-NMR spectrum, a peak of 133 ppm, which is a measure of structural regularity of the electrolyte membrane E, had a full width at half maximum of 550 Hz and the electrolyte membrane E had high structural regularity. Further, an output under low humidity conditions of a fuel cell using the electrolyte membrane E was 710 mW/cm$^2$.

Reference Example 7

Application Example of Direct Methanol Fuel Cell (DMFC))

(1) Preparation of Anode and Cathode

A carbon cloth composed of carbon fiber fabric, manufactured by E-TEK Inc. (USA) was treated with a 20% PTFE dispersion. Specifically, a carbon cloth was immersed in a dispersion containing 20% by weight of polytetrafluoroethylene (hereinafter, abbreviated to PTFE), and after the carbon cloth was pulled out, it was dried and fired. A carbon black dispersion containing 20% by weight of PTFE was applied onto one side of the cloth and fired to prepare an electrode substrate. Onto this electrode substrate, an anode catalyst coating solution composed of a Pt—Ru supported carbon catalysts "HiSPEC" (registered trademark) 7000 and "HiSPEC" (registered trademark) 6000 manufactured by Johnson & Matthey Inc., 20% "NAFION" (registered trademark) solution manufactured by DuPont Co., and n-propanol was applied, and dried to prepare an anode catalyst layer. The anode catalyst coating solution was applied onto the surface on which the carbon black dispersion has been applied. Further, similarly, a cathode catalyst coating solution composed of a Pt supported carbon catalyst TEC10V50E manufactured by Tanaka Kikinzoku Kogyo K.K. and a"Nafion" (registered trademark) solution was applied onto the above electrode substrate and dried to prepare a cathode catalyst layer.

(2) Preparation and Evaluation of Membrane Electrode Assembly (MEA)

Using the assembled polymer electrolyte membrane A in Example 6 as an electrolyte membrane, and this was sandwiched between the anode and the cathode prepared in the above step (1), and the resulting assembly was hot pressed at 100° C. for 30 minutes to prepare a membrane electrode assembly (MEA) in which an electrode area was 5 cm$^2$. This MEA was sandwiched between separators, and a 3% methanol (MeOH) aqueous solution was supplied to an anode side at a flow rate of 0.2 ml/min and air was supplied to a cathode side at a flow rate of 50 ml/min to evaluate electric generation performance. Consequently, an output of 120 mW/cm² was attained, and this was found to have high performance as DMFC application.

DESCRIPTION OF THE REFERENCE NUMERALS AND SYMBOLS 1 substrate pay-off portion
2 porous film pay-off portion
3 portion of application by casting
3A portion of application by casting
3B portion of application by casting
4 drying portion
4A drying portion
4B drying portion
5 assembled polymer electrolyte membrane taking-up portion
6 bonding portion
7 porous film taking-up portion
8 portion where porous film is split into two layers in a thickness direction

INDUSTRIAL APPLICABILITY

The electrolyte membrane and the assembled polymer electrolyte membrane prepared by the production method of the present invention can be applied to various electrochemical systems (for example, a fuel cell, a water electrolytic system, a chloro-alkali electrolytic system, etc.). Among these system, the electrolyte membrane and the assembled polymer electrolyte membrane are suitable for a fuel cell, and are suitable particularly for a fuel cell using hydrogen or a methanol aqueous solution as a fuel, and preferably used for portable devices such as cellular phone, personal computer, PDA, video camera (camcorder), digital camera, handy terminal, RFID reader, digital audio player and various displays; home electrical appliance such as electric shaver and cleaner; electric power tool; home electrical power supplier; automobile such as passenger car, autobus and autotruck; moving vehicle such as two-wheel vehicle, forklift, electric power-assisted bicycle, mobility scooter, electric wheelchair, marine vessel and railroad; and power supply source for various robots and cyborg. Particularly in portable devices, the electrolyte membrane and the assembled polymer electrolyte membrane of the present invention are used not only for power supply source, but also for charging of a secondary cell in a portable device, and moreover can be suitably used as a hybrid type power supply source in which a fuel cell is used in conjunction with a secondary cell, a capacitor or a solar cell.

The invention claimed is:

1. A method for producing a polymer electrolyte membrane, comprising:
    removing by centrifugal separation at least a portion of a salt component comprising a salt and produced during polycondensation from a polymerization solution of a polymer electrolyte having a density of an ionic group of 2 mmol/g or more, subsequent to polycondensation, the removing being without precipitation of a polymer in water or solvent prior to centrifugal separation, thereby preparing a coating solution;
    applying the coating solution on a substrate;
    removing at least a part of a solvent from the coating solution to form a film-shaped material on the substrate; and
    bringing the film-shaped material on the substrate into contact with water and/or an aqueous acidic solution to remove at least a portion of the salt component produced during the polycondensation
    wherein C3<5%, and C4/C3<0.3, when a concentration of the salt component contained in the film-shaped material on the substrate after removing at least a part of said solvent is denoted by C3% by weight, and a concentration of the salt component after bringing the film-shaped material on the substrate into contact with water and/or an aqueous acidic solution to remove at least a portion of the salt component produced during polycondensation is denoted by C4% by weight.

2. The method for producing a polymer electrolyte membrane according to claim 1, further comprising adding a cyclic metal scavenger and/or glycols to the coating solution prior to the applying onto the substrate, and eliminating the cyclic metal scavenger and/or glycols after the removing at least a part of the solvent to form the film-shaped material on the substrate.

3. The method for producing a polymer electrolyte membrane according to claim 1, further comprising desalting and polycondensing a monomer containing a metal salt of an ionic group by adding a cyclic metal scavenger and/or glycols.

4. The method for producing a polymer electrolyte membrane according to claim 1, wherein the film-shaped material on the substrate is brought into contact with water and/or an aqueous acidic solution without peeling the film-shaped material from the substrate to remove at least a portion of the salt component produced during polycondensation.

5. The method for producing a polymer electrolyte membrane according to claim 1, wherein said polymer electrolyte comprises an aromatic hydrocarbon electrolyte containing a hydrolytic group for imparting solubility.

6. The method for producing a polymer electrolyte membrane according to claim 2, wherein said cyclic metal scavenger comprises crown ether.

7. The method for producing a polymer electrolyte membrane according to claim 2, wherein said glycols are polyhydric alcohols or polyethylene glycols having a molecular weight of 500 or less.

8. The method for producing a polymer electrolyte membrane according to claim 1, wherein the removing a part of a salt component produced during polycondensation from a polymerization solution of a polymer electrolyte having a density of an ionic group of 2 mmol/g or more is done by centrifugal separation.

9. The method for producing a polymer electrolyte membrane according to claim 1, wherein the applying the coating solution on a substrate is done by casting.

10. The method for producing a polymer electrolyte membrane according to claim 1, wherein the bringing the film-shaped material on the substrate into contact with water and/or an aqueous acidic solution to remove at least a portion of the salt component produced during the polycondensation comprises removing a portion of the salt component produced during the polycondensation.

* * * * *